United States Patent
Burnett et al.

(10) Patent No.: US 11,155,494 B2
(45) Date of Patent: Oct. 26, 2021

(54) LAMINATED GLASS ARTICLE WITH APERTURE FORMED THEREIN AND METHODS FOR FORMING THE SAME

(71) Applicant: CORNING INCORPORATED, Corning, NY (US)

(72) Inventors: David Aaron Burnett, Horseheads, NY (US); Shai Negev Shafrir, Rochester, NY (US); Kevin Eugene Spring, Lindley, NY (US); Vijay Subramanian, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 378 days.

(21) Appl. No.: 16/087,853

(22) PCT Filed: Mar. 24, 2017

(86) PCT No.: PCT/US2017/024022
§ 371 (c)(1),
(2) Date: Sep. 24, 2018

(87) PCT Pub. No.: WO2017/165772
PCT Pub. Date: Sep. 28, 2017

(65) Prior Publication Data
US 2020/0299185 A1 Sep. 24, 2020

Related U.S. Application Data

(60) Provisional application No. 62/312,767, filed on Mar. 24, 2016.

(51) Int. Cl.
*C03C 19/00* (2006.01)
*C03C 21/00* (2006.01)
(Continued)

(52) U.S. Cl.
CPC ............ *C03C 19/00* (2013.01); *B26D 1/0006* (2013.01); *B26F 1/16* (2013.01); *B32B 3/266* (2013.01);
(Continued)

(58) Field of Classification Search
None
See application file for complete search history.

(56) References Cited

U.S. PATENT DOCUMENTS 9,522,836 B2  12/2016  Gulati et al.
10,196,295 B2  2/2019  Gulati et al.
(Continued)

FOREIGN PATENT DOCUMENTS

CN  101121285 A  2/2008
CN  103786265 A  5/2014
(Continued)

OTHER PUBLICATIONS

Taiwanese Patent Application No. 106109890, Office Action dated Oct. 7, 2020, 4 page of English Translation Only; Taiwanese Patent Office.
(Continued)

*Primary Examiner* — Lisa L Herring

(57) ABSTRACT

A glass article (100) includes a core layer (102) formed from a core glass composition with a core coefficient of thermal expansion (CTE) and first (104) and second (106) cladding layers fused to first and second major surfaces of the core layer (102) and formed from a clad glass composition comprising a clad CTE. An aperture (120) extends through each of the core layer (102), the first cladding layer (104), and the second cladding layer (106). The clad CTE is less than the core CTE such that each of the first (104) and second (106) cladding layers is under a compressive stress and the core layer (102) is under a tensile stress. A flexural
(Continued)

strength of the glass article (100) can be at least about 75 MPa. A peak load sustainable by the glass article (100) in a modified ring-on-ring test can be at most 96.5% less than a peak load sustainable by a reference glass article in the modified ring-on-ring test.

14 Claims, 20 Drawing Sheets

(51) Int. Cl.
  *C03B 33/10*    (2006.01)
  *B32B 7/022*    (2019.01)
  *B32B 7/027*    (2019.01)
  *B32B 3/26*    (2006.01)
  *B32B 17/06*    (2006.01)
  *B26D 1/00*    (2006.01)
  *B26F 1/16*    (2006.01)
  *B26F 1/38*    (2006.01)

(52) U.S. Cl.
  CPC ............ *B32B 7/022* (2019.01); *B32B 7/027* (2019.01); *B32B 17/06* (2013.01); *C03C 21/002* (2013.01); *B26F 1/3806* (2013.01); *B32B 2250/03* (2013.01); *B32B 2250/40* (2013.01); *B32B 2315/08* (2013.01); *B32B 2419/00* (2013.01); *B32B 2509/00* (2013.01); *B32B 2605/08* (2013.01); *C03B 33/10* (2013.01)

(56) References Cited

U.S. PATENT DOCUMENTS

| | | |
|---|---|---|
| 2008/0302222 A1 | 12/2008 | Yanagisawa |
| 2013/0045375 A1 | 2/2013 | Gross |
| 2013/0068505 A1* | 3/2013 | Hong .................... C03C 21/002 174/250 |
| 2014/0141217 A1 | 5/2014 | Gulati et al. |
| 2014/0238078 A1* | 8/2014 | Boek .................... G03F 7/0043 65/30.14 |
| 2015/0165560 A1 | 6/2015 | Hackert et al. |
| 2015/0166392 A1* | 6/2015 | Minami ................. B28D 5/021 409/131 |

FOREIGN PATENT DOCUMENTS

| | | |
|---|---|---|
| CN | 103958425 A | 7/2014 |
| DE | 7323162 U | 9/1973 |
| JP | 48-081860 A | 1/1973 |
| JP | 50-029594 A | 3/1975 |
| JP | 02-045304 A | 2/1990 |
| JP | 04-005367 A | 1/1992 |
| JP | 2014-521582 A | 8/2014 |
| TW | 201304951 A | 2/2013 |
| WO | 2013/016157 A1 | 1/2013 |

OTHER PUBLICATIONS

Chinese Patent Application No. 201780020019.4; English Translation of the First Office Action dated Mar. 26, 2020; China Patent Office; 17 Pgs.

Japanese Patent Application No. 2018-549335 Notice of Grounds for Rejection dated Nov. 4, 2020; 7 Pages; (3 pages of English Translation and 4 pages of Original Document); Japanese Patent Office.

International Search Report and Written Opinion of the International Searching Authority; PCT/US2017/024022; dated Jun. 14, 2017; 11 Pages; European Patent Office.

Chinese Patent Application No. 201780020019.4, Office Action dated Apr. 9, 2021; 17 pages (English Translation only); Chinese Patent Office.

\* cited by examiner

LAMINATED GLASS ARTICLE WITH APERTURE FORMED THEREIN AND METHODS FOR FORMING THE SAME

CROSS-REFERENCE TO RELATED APPLICATIONS

The present specification claims the benefit of priority under 35 U.S.C. § 371 of International Application No. PCT/US2017/024022, filed Mar. 24, 2017, which claims priority to U.S. Provisional Patent Application Ser. No. 62/312,767, filed Mar. 24, 2016, and entitled "Laminated Glass Article with Aperture Formed Therein and Method for Forming the Same," the entirety of each of which is incorporated by reference herein.

BACKGROUND

1. Field

This disclosure relates to glass articles, and more particularly to laminated glass articles comprising a plurality of glass layers and methods for forming the same.

2. Technical Background

Glass articles can be used in a wide variety of products including, for example, auto-glazing, architectural panels, appliances, and cover glass (e.g., for touch-screen devices such as smartphones, tablets, laptop computers, and monitors). Relatively large flaws can be introduced into the surfaces of glass articles during use. For example, is has been observed that, when a smartphone is dropped onto a rough surface such as asphalt, the local indentation caused by contact with sharp features of the rough surface can cause flaws as deep as about 300 µm in the surface of the cover glass. Thus, it would be desirable to provide a glass article with improved resistance to breakage caused by deep flaws to enable improved mechanical reliability and drop performance.

SUMMARY

Disclosed herein are laminated glass articles with apertures formed therein and method for forming the same.

Disclosed herein is a method of forming an aperture in a laminated glass article. The laminated glass article comprises a glass core layer disposed between a first glass cladding layer and a second glass cladding layer. The core layer comprises a core glass composition comprising a core coefficient of thermal expansion (CTE). Each of the first cladding layer and the second cladding layer comprises a clad glass composition comprising a clad CTE. The clad CTE is less than the core CTE such that each of the first cladding layer and the second cladding layer is under a compressive stress and the core layer is under a tensile stress. The method comprises forming a pilot hole through the laminated glass article with a piercing tool having an ADG parameter of less than or equal to 12% as determined by the equation, $$ADG = \frac{10\alpha D_\eta}{\rho} * 100\%$$

where $D_\eta$ is a tip diameter of the piercing tool, $\alpha$ is an included angle of a tip of the piercing tool, and $\rho$ is an average grit size of abrasive material on the piercing tool, and enlarging the pilot hole formed through the glass article with a shaping tool to form the aperture.

Disclosed herein is a method of forming an aperture in a laminated glass article. The laminated glass article comprises a glass core layer disposed between a first glass cladding layer and a second glass cladding layer. The core layer comprises a core glass composition comprising a core coefficient of thermal expansion (CTE). Each of the first cladding layer and the second cladding layer comprises a clad glass composition comprising a clad CTE. The clad CTE is less than the core CTE such that each of the first cladding layer and the second cladding layer is under a compressive stress and the core layer is under a tensile stress. The method comprises forming a pilot hole through the laminated glass article with a piercing tool having an ADG parameter of less than or equal to 12% as determined by the equation, $$ADG = \frac{10\alpha D_\eta}{\rho} * 100\%$$

where $D_\eta$ is a tip diameter of the piercing tool, $\alpha$ is an included angle of a tip of the piercing tool, and $\rho$ is an average grit size of abrasive material on the piercing tool, and enlarging the pilot hole formed through the glass article with a shaping tool comprising abrasive particles disposed on an outer surface of the shaping tool to form the aperture.

Disclosed herein is a glass article comprising a core layer formed from a core glass composition comprising a core coefficient of thermal expansion (CTE). A first cladding layer is fused to a first major surface of the core layer, and a second cladding layer is fused to a second major surface of the core layer. Each of the first cladding layer and the second cladding layer is formed from a clad glass composition comprising a clad CTE. An aperture extends through each of the core layer, the first cladding layer, and the second cladding layer. The clad CTE is less than the core CTE such that each of the first cladding layer and the second cladding layer is under a compressive stress and the core layer is under a tensile stress. A flexural strength of the glass article is at least about 75 MPa.

Disclosed herein is a laminated glass article comprising a glass core layer disposed between a first glass cladding layer and a second glass cladding layer. The core layer comprises a core glass composition comprising a core coefficient of thermal expansion (CTE). Each of the first cladding layer and the second cladding layer comprises a clad glass composition comprising a clad CTE. The clad CTE is less than the core CTE such that each of the first cladding layer and the second cladding layer is under a compressive stress and the core layer is under a tensile stress. An aperture extends through an entire thickness of the glass article. A peak load sustainable by the glass article in a modified ring-on-ring test is at most 96.5% less than a peak load sustainable by a reference glass article in the modified ring-on-ring test. The reference glass article is substantially identical to the glass article but free of an aperture extending therethrough.

Disclosed herein is a method for forming an aperture in a laminated glass article. The laminated glass article comprises a glass core layer disposed between a first glass cladding layer and a second glass cladding layer. The core layer comprises a core glass composition comprising a core coefficient of thermal expansion (CTE). Each of the first cladding layer and the second cladding layer comprises a clad glass composition comprising a clad CTE. The clad CTE is less than the core CTE such that each of the first cladding layer and the second cladding layer is under a compressive stress and the core layer is under a tensile stress. The method comprises forming a pilot hole through the laminated glass article and enlarging the pilot hole formed through the glass article to form the aperture.

It is to be understood that both the foregoing general description and the following detailed description are merely exemplary, and are intended to provide an overview or framework to understanding the nature and character of the claimed subject matter. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
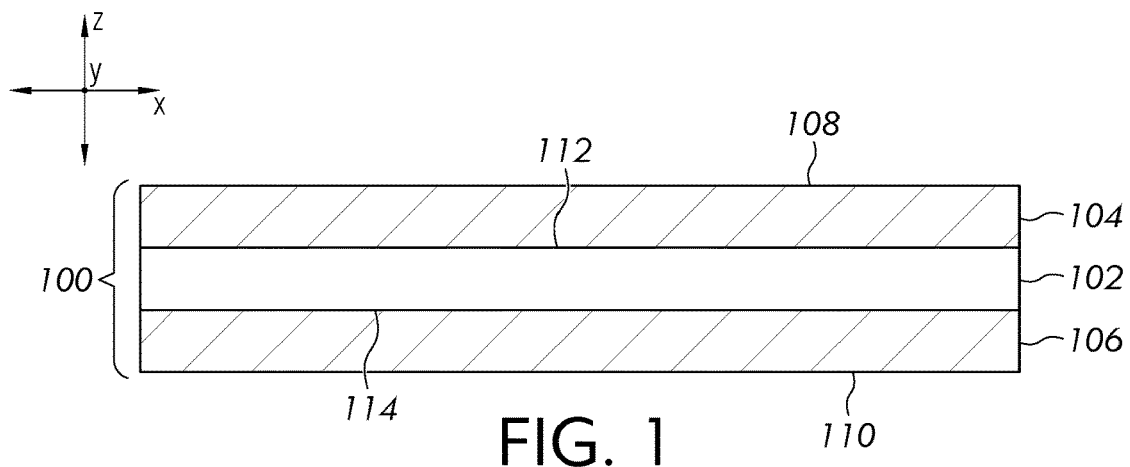
FIG. 1 is a cross-sectional schematic view of one exemplary embodiment of a glass article.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion," or "average CTE," refers to the average coefficient of linear thermal expansion of a given material or layer between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

Figure 17:
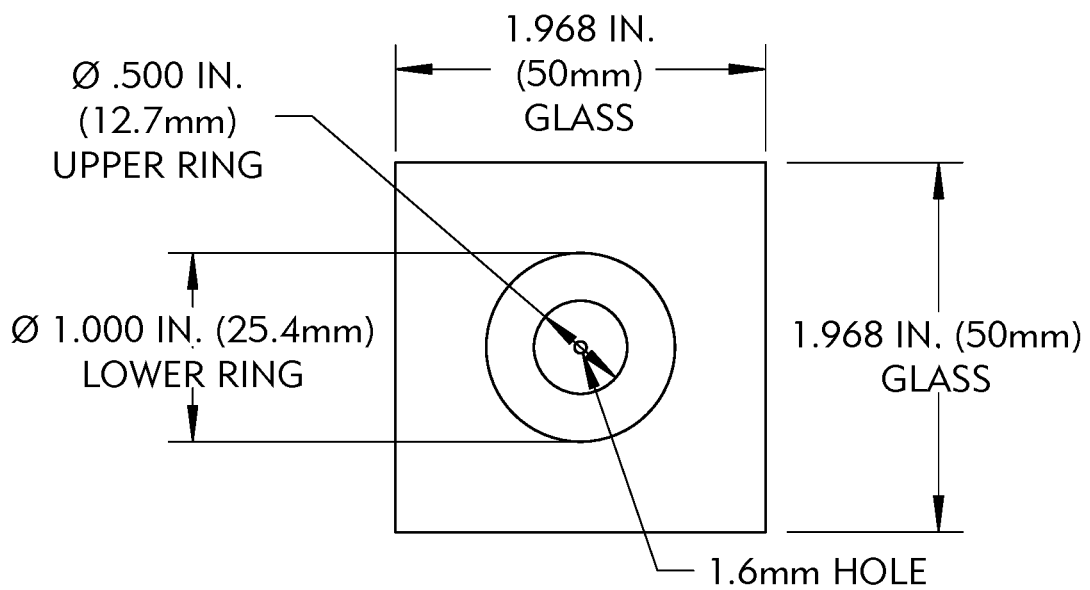
FIG. 17 illustrates a Ring-on-Ring testing set up on a laminated glass article containing a 1.6 mm aperture.
Figure 18:
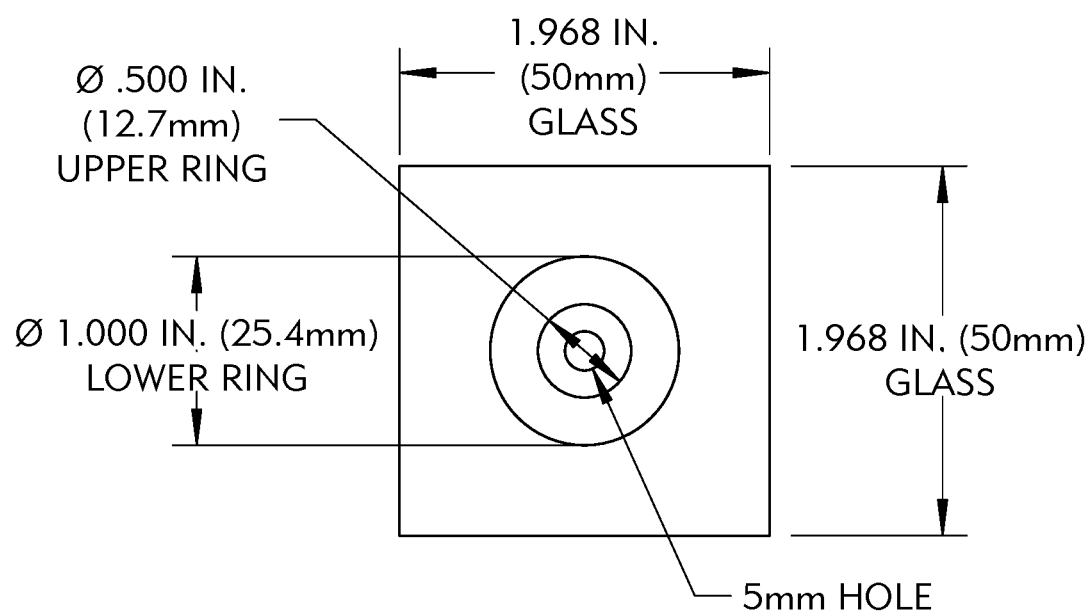
FIG. 18 illustrates a Ring-on-Ring testing set up on a laminated glass article containing a 5 mm aperture.

As used herein, the term "flexural strength" refers to the flexural strength of a glass article determined using a modified ring-on-ring test method (modified ROR test) similar to the test method described in ASTM C1499-03 "Standard Test Method for Monotonic Equibiaxial Flexural Strength of Advanced Ceramics at Ambient Temperature." The modified ROR test is conducted using slightly different test fixtures and test conditions than those described in ASTM C1499-03. Specifically, a 50 mm×50 mm sample is tested using a 1 inch diameter support ring and a ½ inch diameter loading ring. The radius of curvature of the rings is 1/16 inch. The load is applied at a rate of 1.2 mm/min. The test is performed at room temperature in 50% relative humidity. The general conditions for the modified ROR test are outlined in U.S. Patent Application Pub. No. 2013/0045375 (e.g., at paragraph 0027), which is incorporated by reference herein in its entirety. Referring briefly to FIGS. 17 and 18, the modified ROR test is schematically depicted with the rings centered over apertures formed therein. Note that, unless otherwise indicated, the samples tested to generate the data described herein were not abraded prior to testing.

As used herein, the term "peak load" refers to the peak load sustainable by a glass article, or the load at which failure of the glass article occurs, in the modified ROR test.

As used herein, the term "ADG parameter" refers to the ratio of the product of an included angle and a tip diameter of a piercing tool with an average grit size of the abrasive particles of the piercing tool, as will be described in greater detail herein. The ADG parameter is useful in determining whether a particular tool will be appropriate for use as a piercing tool for a glass article comprising high core tensile stresses, as will be discussed in greater detail herein.

In various embodiments described herein, a glass article comprises a compressive stress or a tensile stress at a given depth within the glass article. Compressive stress and/or tensile stress values can be determined using, any suitable technique including, for example, a birefringence based measurement technique, a refracted near-field (RNF) technique, or a photoelastic measurement technique (e.g., using a polarimeter). Exemplary standards for stress measurement include, for example, ASTM C1422/C1422M-10 "Standard Specification for Chemically Strengthened Flat Glass" and ASTM F218 "Standard Method for Analyzing Stress in Glass."

In various embodiments, a laminated glass article comprises a core layer disposed between a first cladding layer and a second cladding layer. The core layer and/or the cladding layers are glass layers comprising a glass material, a ceramic material, a glass-ceramic material, or a combination thereof. In some embodiments, the core layer and/or the cladding layers are transparent glass layers. For example, the glass article transmits at least about 80% of visible light in a wavelength range of about 400 nm to about 700 nm. The core layer is formed from a core glass composition comprising a core CTE. Each of the first cladding layer and the second cladding layer is formed from a clad glass composition comprising a clad CTE. The clad glass composition of the first cladding layer and the clad glass composition of the second cladding layer can be the same as or different from each other. The clad CTE is less than the core CTE such that each of the first cladding layer and the second cladding layer is under a compressive stress and the core layer is under a tensile stress. The core tensile stress may be for example, less than about 58 MPa. For example a maximum core tensile stress may be 57 MPa. In some embodiments, the core tensile stress is less than about 55 MPa. An aperture extends through each of the core layer, the first cladding layer, and the second cladding layer. In some embodiments, a flexural strength of the glass article is at least about 75 MPa. Additionally, or alternatively, a peak load sustainable by the glass article in the modified ROR test is at most 96.5% less than a peak load sustainable by a reference glass article in the modified ROR test. In such embodiments, the reference glass article is substantially identical to the glass article except that the reference glass article is free of an aperture extending therethrough.

FIG. 1 is a cross-sectional view of one exemplary embodiment of a laminated glass article 100. In some embodiments, glass article 100 comprises a laminated sheet comprising a plurality of glass layers. The laminated sheet can be substantially planar as shown in FIG. 1 or non-planar. Glass article 100 comprises a core layer 102 disposed between a first cladding layer 104 and a second cladding layer 106. In some embodiments, first cladding layer 104 and second cladding layer 106 are exterior layers as shown in FIG. 1. For example, an outer surface 108 of first cladding layer 104 serves as an outer surface of glass article 100 and/or an outer surface 110 of second cladding layer 106 serves as an outer surface of the glass article. In other embodiments, the first cladding layer and/or the second cladding layer are intermediate layers disposed between the core layer and an exterior layer.

Core layer 102 comprises a first major surface and a second major surface opposite the first major surface. In some embodiments, first cladding layer 104 is fused to the first major surface of core layer 102. Additionally, or alternatively, second cladding layer 106 is fused to the second major surface of core layer 102. In such embodiments, an interface 112 between first cladding layer 104 and core layer 102 and/or an interface 114 between second cladding layer 106 and core layer 102 are free of any bonding material such as, for example, an adhesive, a coating layer, or any non-glass material added or configured to adhere the respective cladding layers to the core layer. Thus, first cladding layer 104 and/or second cladding layer 106 are fused directly to core layer 102 or are directly adjacent to core layer 102. In some embodiments, the glass article 100 comprises one or more intermediate layers disposed between the core layer 102 and the first cladding layer 104 and/or between the core layer 102 and the second cladding layer 106. For example, the intermediate layers comprise intermediate glass layers and/or diffusion layers formed at the interface of the core layer 102 and the cladding layer. The diffusion layer can comprise a blended region comprising components of each layer adjacent to the diffusion layer (e.g., a blended region between two directly adjacent glass layers). In some embodiments, glass article 100 comprises a glass-glass laminate (e.g., an in situ fused multilayer glass-glass laminate) in which the interfaces between directly adjacent glass layers are glass-glass interfaces.

In some embodiments, core layer 102 comprises a core glass composition, and first and/or second cladding layers 104 and 106 comprise a clad glass composition that is different than the core glass composition. The core glass composition and the clad glass composition are different from each other prior to subjecting the glass article to any type of chemical strengthening treatment as described herein. For example, in the embodiment shown in FIG. 1, core layer 102 comprises or is formed from a first glass composition, and each of first cladding layer 104 and second cladding layer 106 comprises or is formed from a second glass composition. In other embodiments, the first cladding layer 104 comprises or is formed from the second glass composition, and the second cladding layer 106 comprises or is formed from a third glass composition that is different than the first glass composition and the second glass composition.

Figure 2:
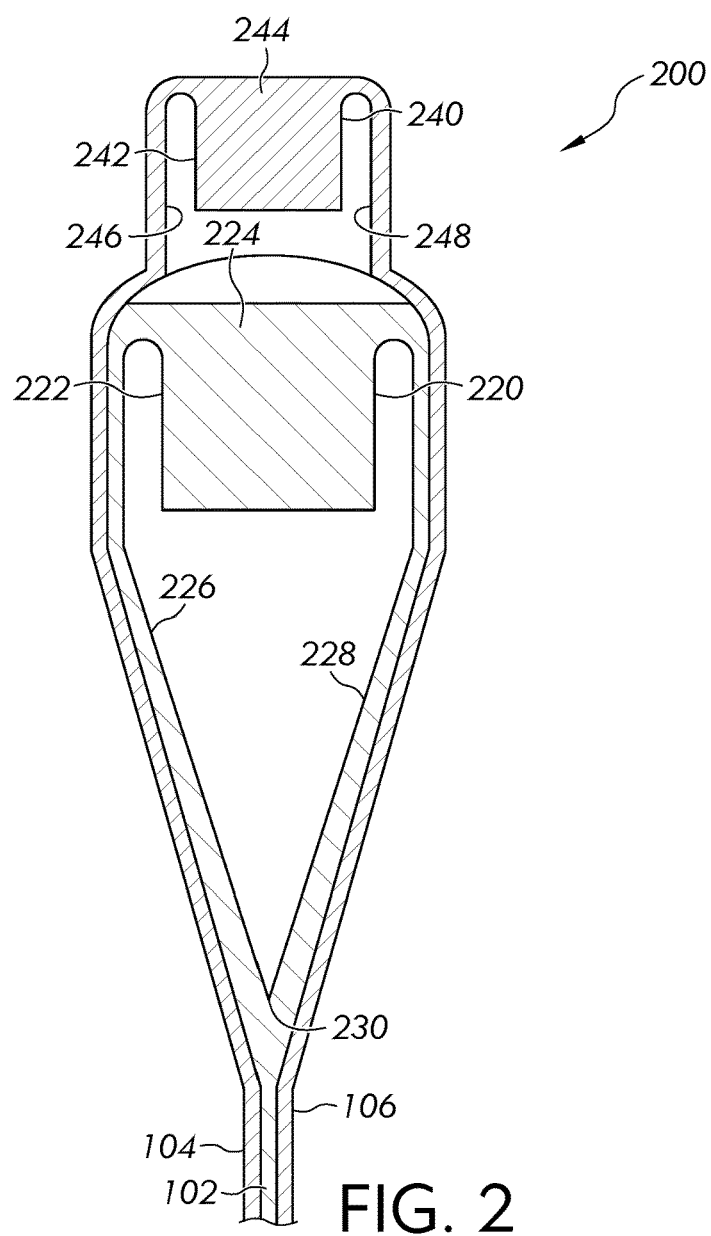
FIG. 2 is a cross-sectional schematic view of one exemplary embodiment of an overflow distributor that can be used to form a glass article.

The glass article 100 can be formed using a suitable process such as, for example, a fusion draw, down draw, slot draw, up draw, or float process. In some embodiments, the glass article 100 is formed using a fusion draw process. FIG. 2 is a cross-sectional view of one exemplary embodiment of an overflow distributor 200 that can be used to form a glass article such as, for example, glass article 100. Overflow distributor 200 can be configured as described in U.S. Pat. No. 4,214,886, which is incorporated herein by reference in its entirety. For example, overflow distributor 200 comprises a lower overflow distributor 220 and an upper overflow distributor 240 positioned above the lower overflow distributor 220. Lower overflow distributor 220 comprises a trough 222. A first glass composition 224 is melted and fed into trough 222 in a viscous state. First glass composition 224 forms core layer 102 of glass article 100 as further described below. Upper overflow distributor 240 comprises a trough 242. A second glass composition 244 is melted and fed into trough 242 in a viscous state. Second glass composition 244 forms first and second cladding layers 104 and 106 of glass article 100 as further described below.

First glass composition 224 overflows trough 222 and flows down opposing outer forming surfaces 226 and 228 of lower overflow distributor 220. Outer forming surfaces 226 and 228 converge at a draw line 230. The separate streams of first glass composition 224 flowing down respective outer forming surfaces 226 and 228 of lower overflow distributor 220 converge at draw line 230 where they are fused together to form core layer 102 of glass article 100.

Second glass composition 244 overflows trough 242 and flows down opposing outer forming surfaces 246 and 248 of upper overflow distributor 240. Second glass composition 244 is deflected outward by upper overflow distributor 240 such that the second glass composition flows around lower overflow distributor 220 and contacts first glass composition 224 flowing over outer forming surfaces 226 and 228 of the lower overflow distributor. The separate streams of second glass composition 244 are fused to the respective separate streams of first glass composition 224 flowing down respective outer forming surfaces 226 and 228 of lower overflow distributor 220. Upon convergence of the streams of first glass composition 224 at draw line 230, second glass composition 244 forms first and second cladding layers 104 and 106 of glass article 100.

In some embodiments, a method comprises contacting first glass composition 224 of core layer 102 in the viscous state with second glass composition 244 of first and second cladding layers 104 and 106 in the viscous state to form the laminated sheet. In some of such embodiments, the laminated sheet is part of a glass ribbon traveling away from draw line 230 of lower overflow distributor 220 as shown in FIG. 2. The glass ribbon can be drawn away from lower overflow distributor 220 by a suitable means including, for example, gravity and/or pulling rollers. The glass ribbon cools as it travels away from lower overflow distributor 220. The glass ribbon is severed to separate the laminated sheet therefrom. Thus, the laminated sheet is cut from the glass ribbon. The glass ribbon can be severed using a suitable technique such as, for example, scoring, bending, thermally shocking, and/or laser cutting. In some embodiments, glass article 100 comprises the laminated sheet as shown in FIG. 1. In other embodiments, the laminated sheet can be processed further (e.g., by cutting or molding) to form glass article 100.

Although glass article 100 shown in FIG. 1 comprises three layers, other embodiments are included in this disclosure. In other embodiments, a glass article can have a determined number of layers, such as four, five, or more layers. For example, a glass article comprising four layers can be formed using a lower overflow distributor with a divided trough so that two glass compositions flow over opposing outer forming surfaces of the lower overflow distributor and converge at the draw line. A glass article comprising five or more layers can be formed using additional overflow distributors and/or using overflow distributors with divided troughs. Thus, a glass article having a determined number of layers can be formed by modifying the overflow distributor accordingly.

Although glass article 100 shown in FIG. 1 comprises a laminated sheet, other embodiments are included in this disclosure. In other embodiments, a glass article comprises a laminated tube comprising multiple tubular layers (e.g., formed by one or more annular orifices). For example, a partial cross-section of the laminated tube comprises a laminate structure similar to that shown in FIG. 1. In other embodiments, a glass article comprises a shaped glass article (e.g., formed by shaping or molding a laminated sheet).

A thickness of glass article 100 can be measured as the distance between opposing outer surfaces (e.g., outer surfaces 108 and 110) of the glass article. In some embodiments, glass article 100 comprises a thickness of at least about 0.05 mm, at least about 0.1 mm, at least about 0.2 mm, or at least about 0.3 mm. Additionally, or alternatively, glass article 100 comprises a thickness of at most about 2 mm, at most about 1.5 mm, at most about 1 mm, at most about 0.7 mm, or at most about 0.5 mm. In some embodiments, a ratio of a thickness of core layer 102 to a thickness of glass article 100 is at least about 0.7, at least about 0.8, at least about 0.85, at least about 0.9, or at least about 0.95. Additionally, or alternatively, the ratio of the thickness of core layer 102 to the thickness of glass article 100 is at most about 0.95, at most about 0.93, at most about 0.9, at most about 0.87, or at most about 0.85. In some embodiments, a thickness of each of first cladding layer 104 and second cladding layer 106 is from about 0.01 mm to about 0.3 mm.

In some embodiments, the first glass composition of core layer 102 and/or the second glass composition of first cladding layer 104 and/or second cladding layer 106 comprise a liquidus viscosity of at least about 30 kiloPoise (kP), at least about 50 kP, at least about 100 kP, at least about 200 kP, or at least about 300 kP. In some embodiments, the first glass composition and/or the second glass composition comprise a liquidus viscosity suitable for forming glass article 100 using a fusion draw process as described herein. For example, the first glass composition of core layer 102 comprises a liquidus viscosity of at least about 100 kP, at least about 200 kP, or at least about 300 kP. Additionally, or alternatively, the first glass composition comprises a liquidus viscosity of at most about 3000 kP, at most about 2500 kP, at most about 1000 kP, or at most about 800 kP. Additionally, or alternatively, the second glass composition of first cladding layer 104 and/or second cladding layer 106 comprises a liquidus viscosity of at least about 50 kP, at least about 100 kP, or at least about 200 kP. Additionally, or alternatively, the second glass composition comprises a liquidus viscosity of at most about 3000 kP, at most about 2500 kP, at most about 1000 kP, or at most about 800 kP. The first glass composition can aid in carrying the second glass composition over the overflow distributor to form the second layer. Thus, the second glass composition can comprise a liquidus viscosity that is lower than generally considered suitable for forming a single layer sheet using a fusion draw process.

In some embodiments, glass article 100 is mechanically strengthened. For example, the second glass composition of first cladding layer 104 and/or second cladding layer 106 comprises a different CTE than the first glass composition of core layer 102. Such a CTE contrast between directly adjacent layers of glass article 100 can result in mechanical strengthening of the glass article. For example, first and second cladding layers 104 and 106 are formed from a glass composition (e.g., the second glass composition) having a lower CTE than a glass composition (e.g., the first glass composition) of core layer 102. Thus, glass article 100 comprises a CTE contrast $CTE_{core}-CTE_{clad}$ that is greater than zero. The relatively lower CTE of first and second cladding layers 104 and 106 compared to core layer 102 results in formation of compressive stress in the cladding layers and tensile stress in the core layer upon cooling of glass article 100. Thus, the difference between the CTE $CTE_{core}$ of core layer 102 and the CTE $CTE_{clad}$ of first cladding layer 104 and/or second cladding layer 106, or CTE contrast $CTE_{core}-CTE_{clad}$, produces compressive stress in the cladding layers, whereby glass article 100 is mechanically strengthened. In embodiments in which the cladding layers are exterior layers of the glass article, such compressive stress in the cladding layers can be beneficial for the strength of the glass article by resisting propagation of flaws present at the outer surface of the glass article. In various embodiments, each of the first and second cladding layers, independently, can have a higher CTE, a lower CTE, or substantially the same CTE as the core layer.

In some embodiments, the CTE of core layer 102 and the CTE of first cladding layer 104 and/or second cladding layer 106 differ by at least about $1\times10^{-7\circ}$ C.$^{-1}$, at least about $2\times10^{-7\circ}$ C.$^{-1}$, at least about $3\times10^{-7\circ}$ C.$^{-1}$, at least about $4\times10^{-7\circ}$ C.$^{-1}$, at least about $5\times10^{-7\circ}$ C.$^{-1}$, at least about $10\times10^{-7\circ}$ C.$^{-1}$, at least about $15\times10^{-7\circ}$ C.$^{-1}$, at least about $20\times10^{-7\circ}$ C.$^{-1}$, at least about $25\times10^{-7\circ}$ C.$^{-1}$, at least about $30\times10^{-7\circ}$ C.$^{-1}$, at least about $35\times10^{-7\circ}$ C.$^{-1}$, at least about $40\times10^{-7\circ}$ C.$^{-1}$, or at least about $45\times10^{-7\circ}$ C.$^{-1}$. Additionally, or alternatively, the CTE of core layer 102 and the CTE of first cladding layer 104 and/or second cladding layer 106 differ by at most about $100\times10^{-7\circ}$ C.$^{-1}$, at most about $75\times10^{-7\circ}$ C.$^{-1}$, at most about $50\times10^{-7\circ}$ C.$^{-1}$, at most about $40\times10^{-7\circ}$ C.$^{-1}$, at most about $30\times10^{-7\circ}$ C.$^{-1}$, at most about $20\times10^{-7\circ}$ C.$^{-1}$, at most about $10\times10^{-7\circ}$ C.$^{-1}$, at most about $9\times10^{-7\circ}$ C.$^{-1}$, at most about $8\times10^{-7\circ}$ C.$^{-1}$, at most about $7\times10^{-7\circ}$ C.$^{-1}$, at most about $6\times10^{-7\circ}$ C.$^{-1}$, or at most about $5\times10^{-7\circ}$ C.$^{-1}$. For example, in some embodiments, the CTE of core layer 102 and the CTE of first cladding layer 104 and/or second cladding layer 106 differ by about $1\times10^{-7\circ}$ C.$^{-1}$ to about $10\times10^{-7\circ}$ C.$^{-1}$ or about $1\times10^{-7\circ}$ C.$^{-1}$ to about $5\times10^{-7\circ}$ C.$^{-1}$. In some embodiments, the second glass composition of first cladding layer and/or second cladding layer comprises a CTE of at most about $90\times10^{-7\circ}$ C.$^{-1}$, at most about $89\times10^{-7\circ}$ C.$^{-1}$, at most about $88\times10^{-7\circ}$ C.$^{-1}$, at most about $80\times10^{-7\circ}$ C.$^{-1}$, at most about $70\times10^{-7\circ}$ C.$^{-1}$, at most about $60\times10^{-7\circ}$ C.$^{-1}$, at most about $50\times10^{-7\circ}$ C.$^{-1}$, at most about $40\times10^{-7\circ}$ C.$^{-1}$, or at most about $35\times10^{-7\circ}$ C.$^{-1}$. Additionally, or alternatively, the second glass composition of first cladding layer 104 and/or second cladding layer 106 comprises a CTE of at least about $10\times10^{-7\circ}$ C.$^{-1}$, at least about $15\times10^{-7\circ}$ C.$^{-1}$, at least about $25\times10^{-7\circ}$ C.$^{-1}$, at least about $30\times10^{-7\circ}$ C.$^{-1}$, at least about $40\times10^{-7\circ}$ C.$^{-1}$, at least about $50\times10^{-7\circ}$ C.$^{-1}$, at least about $60\times10^{-7\circ}$ C.$^{-1}$, at least about $70\times10^{-7\circ}$ C.$^{-1}$, at least about $80\times10^{-7\circ}$ C.$^{-1}$, or at least about $85\times10^{-7\circ}$ C.$^{-1}$. Additionally, or alternatively, the first glass composition of core layer 102 comprises a CTE of at least about $40\times10^{-7\circ}$ C.$^{-1}$, at least about $50\times10^{-7\circ}$ C.$^{-1}$, at least about $55\times10^{-7\circ}$ C.$^{-1}$, at least about $65\times10^{-7\circ}$ C.$^{-1}$, at least about $70\times10^{-7\circ}$ C.$^{-1}$, at least about $80\times10^{-7\circ}$ C.$^{-1}$, or at least about $90\times10^{-7\circ}$ C.$^{-1}$. Additionally, or alternatively, the first glass composition of core layer 102 comprises a CTE of at most about $120\times10^{-7\circ}$ C.$^{-1}$, at most about $110\times10^{-7\circ}$ C.$^{-1}$, at most about $100\times10^{-7\circ}$ C.$^{-1}$, at most about $90\times10^{-7\circ}$ C.$^{-1}$, at most about $75\times10^{-7\circ}$ C.$^{-1}$, or at most about $70\times10^{-7\circ}$ C.$^{-1}$.

In various embodiments, the glass article comprises an aperture extending through each of the core layer, the first cladding layer, and the second cladding layer. Forming an aperture in a glass article can reduce the flexural strength of the glass article. Such reduced flexural strength may make the glass article unsuitable for applications in which the glass article may be subjected to damage-inducing conditions such as, for example, vehicle applications (e.g., autoglazing, interior panels, and exterior panels), architectural panels, appliances, and consumer electronics applications (e.g., cover glass or backplane for touch-screen devices such as smartphones, tablets, laptop computers, and monitors). For example, edge flaws that may be present in the interior edge bounding the aperture can cause cracks to propagate from the interior edge across a length and/or width of the glass article. In embodiments in which the glass article is strengthened (e.g., mechanically and/or chemically strengthened) as described herein, the cladding layers are in compression, and the core layer is in tension. Because a crack is able to propagate more easily through glass in tension, the glass article may be especially vulnerable to propagation of cracks at an exposed portion of the core layer at the interior edge during or following formation of the aperture.

Figure 3:
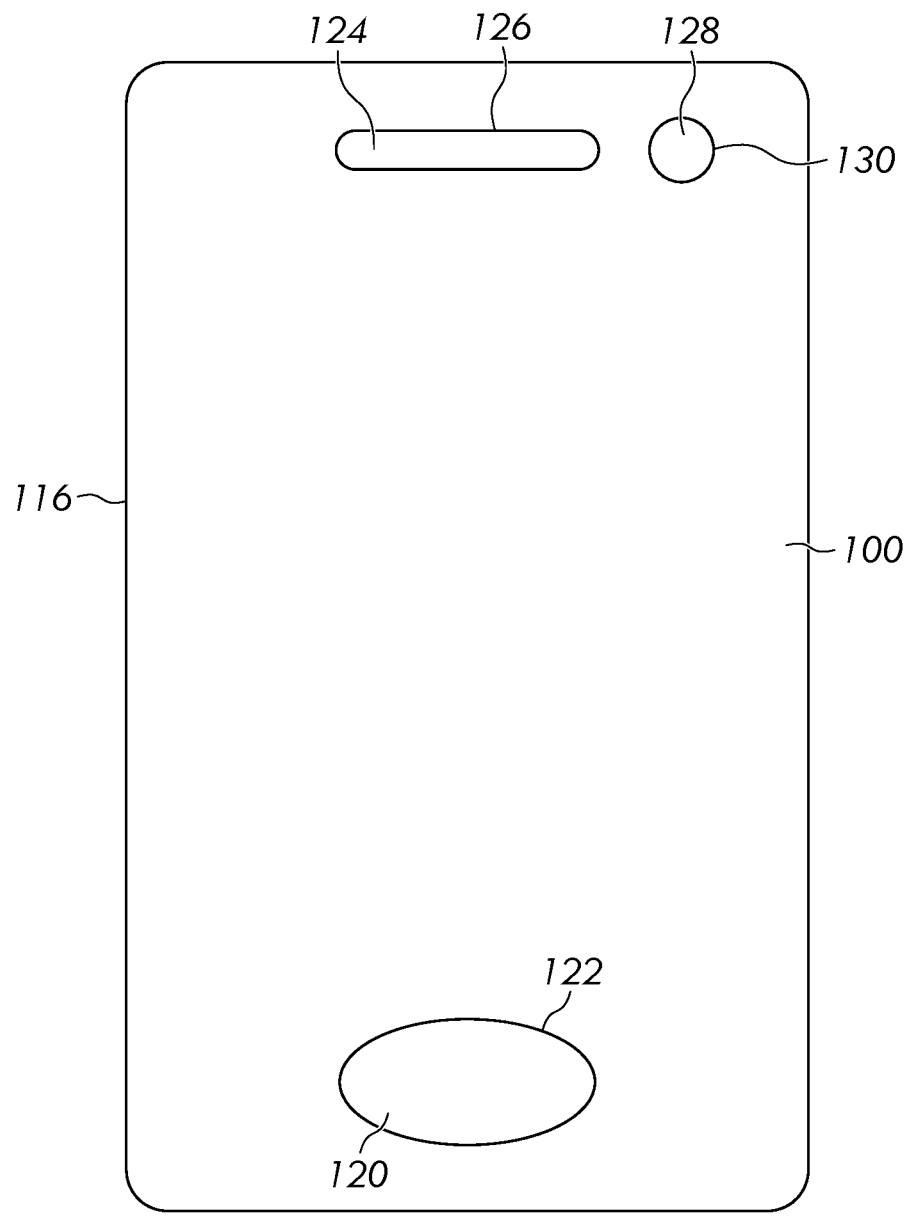
FIG. 3 is a perspective view of the glass article of FIG. 1 with an aperture formed therein.

FIG. 3 is a perspective view of glass article 100 with an aperture 120 formed therein. Glass article 100 comprises an exterior edge 116 that defines an outer perimeter of the glass article. In some embodiments, glass article 100 comprises a part cut from a larger glass sheet. For example, the part can be cut from the glass sheet by mechanical cutting (e.g., scribe and break), thermal stress (e.g., heating with a heated wire, a torch, a laser, or another heating device), and/or laser cutting (e.g., as described in U.S. Patent Application Pub. No. 2015/0165560, which is incorporated by reference herein in its entirety). In such embodiments, at least a portion of exterior edge 116 comprises a cut edge. The cut edge can be used as formed or subjected to a further finishing process (e.g., grinding and/or polishing). Aperture 120 extends through each of first cladding layer 104, core layer 102, and second cladding layer 106. Thus, aperture 120 extends entirely through the thickness of glass article 100. In the embodiment shown in FIG. 3, aperture 120 comprises an elliptical shape. In other embodiments, the aperture comprises a circular, rectangular, or other polygonal or non-polygonal shape.

In some embodiments, aperture 120 is a straight aperture with side walls extending substantially perpendicular to outer surface 108 of first cladding layer 104 and or outer surface 110 of second cladding layer 106. For example, an area of aperture 120 remains substantially constant from outer surface 108 of first cladding layer 104 to outer surface 110 of second cladding layer 106. In other embodiments, aperture 120 is a tapered aperture with side walls extending non-perpendicular to outer surface 108 of first cladding layer 104 and or outer surface 110 of second cladding layer 106. For example, the area of aperture 120 increases or decreases from outer surface 108 of first cladding layer 104 to outer surface 110 of second cladding layer 106. In other embodiments, the sidewalls of aperture 120 taper inward or outward throughout a first portion of the thickness of glass article 100 and remain substantially constant or taper in an opposite direction throughout a second portion of the thickness of the glass article. For example, the area of aperture 120 decreases from outer surface 108 of first cladding layer 104 to an intermediate point and increases from the intermediate point to outer surface 110 of second cladding layer 106.

In various embodiments, glass article 100 comprises a flexural strength of at least about 75 MPa with aperture 120 formed therein. For example, glass article 100 comprises a flexural strength of at least about 75 MPa, at least about 80 MPa, at least about 85 MPa, at least about 90 MPa, or at least about 94 MPa. Additionally, or alternatively, glass article comprises a flexural strength of at most about 2100 MPa, at most about 2000 MPa, at most about 1900 MPa, at most about 1800 MPa, at most about 1700 MPa, at most about 1600 MPa, at most about 1500 MPa, at most about 1400 MPa, at most about 1300 MPa, at most about 1200 MPa, at most about 1100 MPa, at most about 1000 MPa, at most about 900 MPa, at most about 800 MPa, at most about 700 MPa, at most about 600 MPa, at most about 500 MPa, at most about 400 MPa, at most about 300 MPa, at most about 200 MPa, or at most about 100 MPa. Aperture 120 is bounded by an interior edge 122. In various embodiments, aperture 120 is formed such that an edge quality of interior edge 122 is sufficient to enable glass article 100 to have the high flexural strength described herein.

In some embodiments, a peak load sustainable by glass article 100 in the modified ROR test is at most 96.5% less than a peak load sustainable by a reference glass article in the modified ROR test. For example, the peak load sustainable by glass article 100 is at most 96.4%, at most 96.3%, at most 96.2%, at most 96.1%, at most 96%, at most 95.9%, at most 95.8%, at most 95.7%, at most 95.6%, at most 95.5%, at most 95.4%, at most 95.3%, at most 95.2%, or at most 95.1% less than the peak load sustainable by the reference glass article. In such embodiments, the reference glass article is substantially identical to the glass article except that the reference glass article is free of an aperture extending therethrough.

In some embodiments, the high flexural strength of glass article 100 is achieved without grinding or polishing interior edge 122 after forming aperture 120 therein. Thus, glass article 100 with interior edge 122 in an as formed condition comprises the high flexural strength described herein. For example, interior edge 122 of glass article 100 comprising the high flexural strength described herein comprises an Ra surface roughness of at least about 0.05 μm. Such an Ra surface roughness can be contrasted with a ground and/or polished edge, which generally has an Ra surface roughness of less than 0.05 μm, such as 0.002 μm or less. Additionally, or alternatively, interior edge 122 of glass article 100 comprising the high flexural strength described herein comprises an Ra surface roughness of at most about 0.5 μm. Achieving high flexural strength without a secondary grinding or polishing process can reduce the cost and/or complexity of manufacturing the glass article and/or avoid breakage of the glass article that can be caused by such processing.

In some embodiments, the glass article comprises a plurality of apertures. For example, in the embodiment shown in FIG. 3, the plurality of apertures comprises aperture 120 bounded by interior edge 122, a second aperture 124 bounded by an interior edge 126, and a third aperture 128 bounded by an interior edge 130. Aperture 124 is configured as a slot having a substantially rectangular shape with rounded ends. Aperture 128 is configured as a hole having a circular shape. In other embodiments, each aperture independently can have another suitable shape as described herein. Each of the plurality of apertures is formed such that an edge quality of the respective interior edge is sufficient to enable glass article 100 to have the high flexural strength described herein.

In some embodiments, glass article 100 shown in FIG. 3 can be used as a cover glass for a smartphone. Thus, aperture 120 can provide an opening for a button, aperture 124 can provide an opening for an earpiece or speaker, and/or aperture 128 can provide an opening for a camera. In other embodiments, the glass article comprises a suitable number of apertures positioned at suitable locations for an intended application of the glass article.

In some embodiments, glass article 100 is chemically strengthened. For example, glass article 100 is subjected to an ion-exchange treatment to increase the compressive stress in a region of the glass article near exposed surfaces of the glass article. Glass article 100 can be subjected to the ion-exchange treatment before or after forming the aperture therein. Thus, the exposed surfaces can include one or more outer surfaces (e.g., outer surface 108 and/or outer surface 110), one or more interior edges (e.g., interior edge 122, interior edge 126, and/or interior edge 130), and/or one or more exterior edges (e.g., exterior edge 116) of glass article 100.

In some embodiments, the ion-exchange treatment comprises applying an ion-exchange medium to one or more exposed surfaces of glass article 100. The ion-exchange medium comprises a solution, a paste, a gel, a liquid, a vapor, a plasma, or another suitable medium comprising larger ions to be exchanged with smaller ions in the glass matrix (e.g., the glass matrix of first cladding layer 104 and/or the second cladding layer 106). The terms "larger ions" and "smaller ions" are relative terms, meaning that the larger ions are relatively large compared to the smaller ions, and the smaller ions are relatively small compared to the larger ions. Thus, the larger ions have a larger ionic radius than the smaller ions, and the smaller ions have a smaller ionic radius than the larger ions. In some embodiments, core layer 102, first cladding layer 104, and/or second cladding layer 106 of glass article 100 comprise an alkali aluminosilicate glass. Thus, the smaller ions in glass article 100 and the larger ions in the ion exchange medium may be monovalent alkali metal cations (e.g., $Li^+$, $Na^+$, $K^+$, $Rb^+$, and/or $Cs^+$). Alternatively, monovalent cations in glass article 100 may be replaced with monovalent cations other than alkali metal cations (e.g., $Ag^+$ or the like). In some embodiments, core layer 102, first cladding layer 104, and/or second cladding layer 106 of glass article 100 comprise an alkaline earth aluminosilicate glass. Thus, the smaller ions in glass article 100 and the larger ions in the ion exchange medium may be divalent alkaline earth cations (e.g., $Be^{2+}$, $Mg^{2+}$, $Ca^{2+}$, $Sr^{2+}$, and/or $Ba^{2+}$). In some embodiments, the ion-exchange medium comprises a molten salt solution, and the ion-exchange treatment comprises immersing the laminated glass article in a molten salt bath comprising larger ions (e.g., $K^+$, $Na^+$, $Ba^{2+}$, $Sr^{2+}$, and/or $Ca^{2+}$) to be exchanged with smaller ions (e.g., $Na^+$, $Li^+$, $Ca^{2+}$, and/or $Mg^{2+}$) in the glass matrix. In some embodiments, the molten salt bath comprises a salt (e.g., a nitrate, a sulfate, and/or a chloride) of the larger ions. For example, the molten salt bath comprises molten KNO$_3$, molten NaNO$_3$, or a combination thereof. Additionally, or alternatively, the temperature of the molten salt bath is from about 380° C. to about 450° C., and an immersion time is from about 2 hours to about 16 hours.

By replacing smaller ions in the glass matrix with larger ions at exposed surfaces of glass article 100, the tensile stress of core layer 102 is reduced or eliminated or a compressive stress is formed near the exposed surface of the glass article. Additionally, or alternatively, the compressive stress of first cladding layer 104 and/or second cladding layer 106 is increased or generated near the exposed surface of glass article 100. For example, during the ion-exchange treatment, the larger ions from the ion-exchange medium diffuse into an outer portion of core layer 102 near the exposed surface of glass article 100, and the smaller ions from the glass matrix diffuse out of the outer portion of the core layer. Thus, the outer portion of core layer 102 comprises an ion-exchanged region of glass article 100. The increased concentration of the larger ions in the ion-exchanged region causes crowding of the glass matrix and decreases the tensile stress and/or generates compressive stress in the ion-exchanged region. Thus, the ion-exchanged region comprises a reduced tensile stress relative to the remainder (e.g., the non-ion-exchanged region) of core layer 102. Additionally, or alternatively, during the ion-exchange treatment, the larger ions from the ion-exchange medium diffuse into an outer portion of first cladding layer 104 and/or second cladding layer 106 near the exposed surface of glass article 100, and the smaller ions from the glass matrix diffuse out of the outer portion of the first cladding layer and/or the second cladding layer. Thus, the outer portion of first cladding layer 104 and/or second cladding layer 106 comprises an ion-exchanged region of glass article 100. The increased concentration of the larger ions in the ion-exchanged region causes crowding of the glass matrix and increases the compressive stress of glass article 100 in the ion-exchanged region. Thus, the ion-exchanged region comprises an increased compressive stress relative to the compressive stress of the remainder (e.g., the non-ion-exchanged region) of first cladding layer 104 and/or second cladding layer 106.

In some embodiments, glass article is mechanically strengthened as described herein (e.g., the CTE of first cladding layer 104 and/or second cladding layer 106 is lower than the CTE of core layer 102). In such embodiments, subjecting glass article 100 to the ion-exchange treatment increases a surface compressive stress at the outer surface of the glass article (e.g., from an initial surface compressive stress generated by the CTE mismatch) to a final surface compressive stress. For example, the final compressive stress is at least about 200 MPa, at least about 300 MPa, at least about 400 MPa, at least about 500 MPa, at least about 600 MPa, at least about 700 MPa, at least about 800 MPa, at least about 900 MPa, or at least about 1000 MPa. Additionally, or alternatively, the final compressive stress value is at most about 1300 MPa, at most about 1200 MPa, at most about 1100 MPa, at most about 1000 MPa, at most about 900 MPa, or at most about 800 MPa.

In some embodiments, a method for forming an aperture in a laminated glass article comprises forming a pilot hole through the glass article and then enlarging the pilot hole to the desired dimensions of the aperture. For example, the forming the pilot hole comprises drilling through the glass article with a mechanical cutting tool or a series of mechanical cutting tools. The mechanical cutting tool comprises, for example, a drill bit, a router bit, or another suitable cutting tool.

Figure 4:
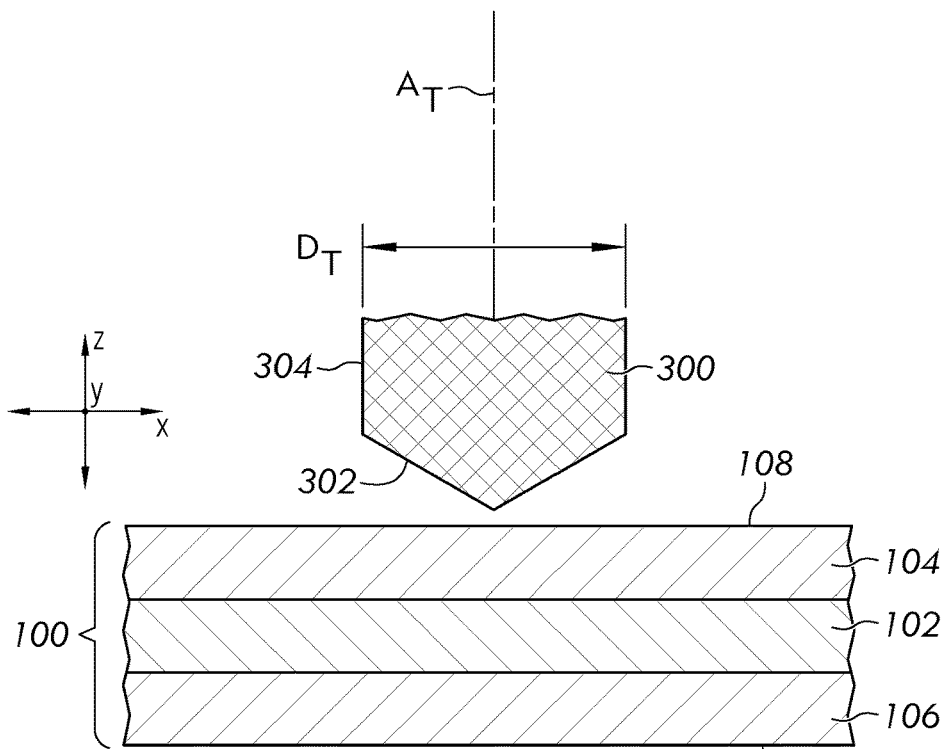
FIG. 4 is a cross-sectional schematic view of the glass article of FIG. 1 prior to an aperture being formed therein and one exemplary embodiment of a mechanical cutting tool positioned to form the aperture in the glass article.

FIG. 4 is a cross-sectional schematic view of glass article 100 prior to aperture 120 being formed therein and one exemplary embodiment of a mechanical cutting tool 300 positioned to form the aperture in the glass article. Mechanical cutting tool 300 comprises a tool axis $A_T$ and a tool diameter $D_T$. The tool diameter is, for example, at most about 2 mm, at most about 1.8 mm, at most about 1.6 mm, or at most about 1.4 mm. Additionally, or alternatively, the tool diameter is, for example, at least about 0.5 mm, at least about 0.7 mm, at least about 0.9 mm, or at least about 1.1 mm. In some embodiments, mechanical cutting tool 300 comprises a tool head 302 positioned at a distal end of the mechanical cutting tool 300 and a tool shaft 304 extending proximally from the tool head 302. In the embodiment shown in FIG. 4, tool head 302 is configured as a tapered head. In other embodiments, the tool head comprises a blunt, rounded, or other suitable shape. Tool head 302 and tool shaft 304 can be a unitary component or separate components coupled together to form mechanical cutting tool 300. Mechanical cutting tool 300 can be formed from or comprise, for example, diamond, silicon carbide, or another suitable material. Tool head 302 and tool shaft 304 can be formed from the same or different materials. For example, tool head 302 is formed from a hardened material (e.g., diamond or silicon carbide), and tool shaft 304 is formed from a different material (e.g., steel). In some embodiments, tool head 302 and/or tool shaft 304 is coated with a hardened material. For example, tool head 302 and/or tool shaft 304 is formed from stainless steel and coated with diamond or silicon carbide.

In some embodiments, mechanical cutting tool 300 comprises abrasive particles disposed on an outer surface of the mechanical cutting tool. For example, a working portion of mechanical cutting tool 300 comprises abrasive particles disposed on an outer surface thereof. The working portion of mechanical cutting tool 300 comprises tool head 302. In some embodiments, the working portion of mechanical cutting tool 300 further comprises a distal portion of tool shaft 304. The working portion of mechanical cutting tool 300 comprises a working length. The working length is, for example, at least about 0.5 mm, at least about 1 mm, at least about 1.5 mm, at least about 2 mm, at least about 2.5 mm, or at least about 3 mm. Additionally, or alternatively, the working length is at most about 10 mm, at most about 8 mm, at most about 6 mm, at most about 5 mm, or at most about 4 mm. The abrasive particles comprise, for example, diamond grit (e.g., grit plated diamond), silicon carbide, or another suitable abrasive material.

In some embodiments, different portions of the mechanical cutting tool comprise abrasive particles of different sizes. For example, mechanical cutting tool 300 comprises rough abrasive particles at tool head 302 and fine abrasive particles at a proximal end of the working portion. In some embodiments, the rough abrasive particles comprise, consist essentially of, or consist of particles that are 600 grit or coarser, 500 grit or coarser, or 450 grit or coarser. Additionally, or alternatively, the rough abrasive comprise, consist essentially of, or consist of particles that are 200 grit or finer. Additionally, or alternatively, the fine abrasive particles comprise, consist essentially of, or consist of particles that are 800 grit or finer, 900 grit or finer, 1000 grit or finer, or 1100 grit or finer. Additionally, or alternatively, the fine abrasive particles comprise, consist essentially of, or consist of particles that are 1600 grit or coarser. In some embodiments, the size of the abrasive particles changes gradually (e.g., continuously or substantially continuously) from fine to rough in a proximal direction along mechanical cutting tool 300 from tool head 302 toward the proximal end of the working portion. Thus, the abrasive particles in contact with the glass article become finer as the mechanical cutting tool is advanced farther into the glass article as described herein.

In some embodiments, the drilling through the glass article with the mechanical cutting tool 300 comprises rotating the mechanical cutting tool 300 about the tool axis at a rotational speed. The rotational speed is, for example, at least about 40,000 rpm, at least about 45,000 rpm, at least about 50,000 rpm, at least about 55,000 rpm, or at least about 57,000 rpm. Additionally, or alternatively, the rotational speed is, for example, at most about 80,000 rpm, at most about 75,000 rpm, at most about 70,000 rpm, at most about 65,000 rpm, or at most about 63,000 rpm. In some embodiments, the rotation speed is between about 56,000 and 62,000. Such a rotational speed can help to reduce damage to the glass article 100 and produce an aperture with a sufficient edge quality to enable the glass article 100 to have the high flexural strength as described herein.

Figure 5:
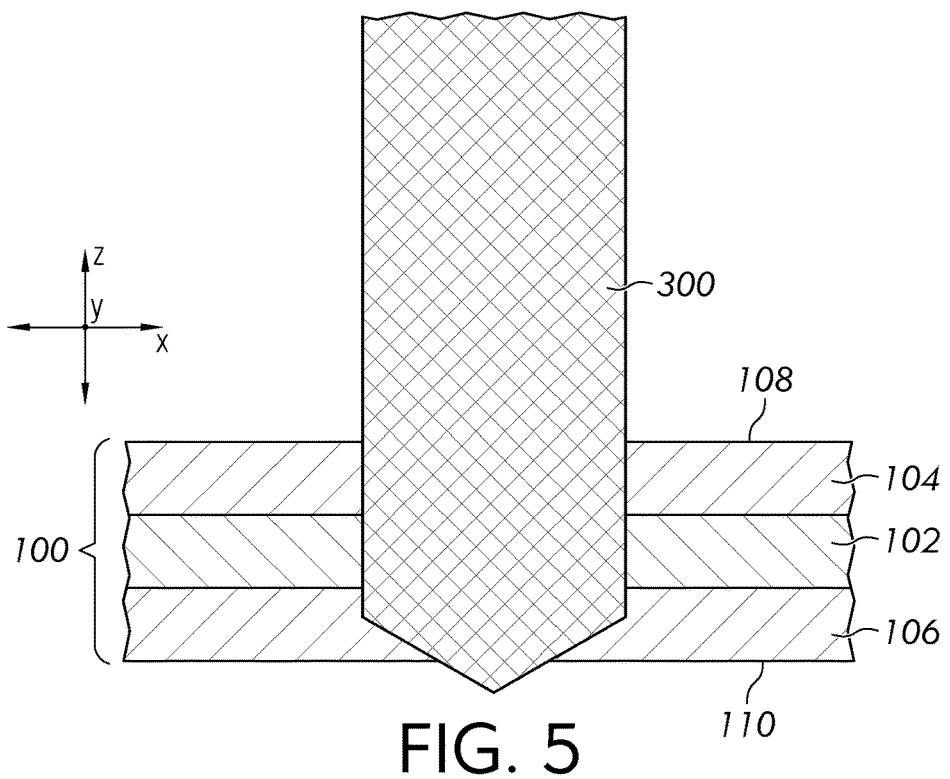
FIG. 5 is a cross-sectional schematic view of the mechanical cutting tool of FIG. 4 after contacting an outer surface of the glass article and advancing through the glass article.

In some embodiments, the drilling through the glass article with the mechanical cutting tool 300 comprises contacting the outer surface of the glass article 100 with the mechanical cutting tool 300 and advancing the mechanical cutting tool 300 through the glass article 100 at a speed. In some embodiments, the mechanical cutting tool 100 is rotating at the rotational speed during the contacting and the advancing steps. FIG. 5 is a cross-sectional schematic view of mechanical cutting tool 300 after contacting outer surface 108 of glass article 100 and advancing the mechanical cutting tool through the glass article. In some embodiments, advancing mechanical cutting tool 300 through glass article 100 comprises advancing the mechanical cutting tool 300 in a thickness direction (e.g., the Z-direction) through the glass article 100. For example, outer surface 108 of first cladding layer 104 is contacted with mechanical cutting tool 300, and the mechanical cutting tool 300 is advanced into the glass article 100 toward outer surface 110 of second cladding layer 106 at a substantially constant speed. For example, the mechanical cutting tool 300 may be advanced at a speed of about 10 mm/min to about 15 mm/min (e.g., 13 mm/min). In some embodiments, mechanical cutting tool 300 is advanced at an initial speed until the mechanical cutting tool penetrates entirely through glass article 100 as shown in FIG. 5. In other embodiments, mechanical cutting tool 300 is advanced at the initial speed until the mechanical cutting tool 300 penetrates through a portion of the thickness of glass article 100 to an initial depth that is less than the thickness of the glass article 100 and then advanced at a different speed until the mechanical cutting tool 300 penetrates through a remainder of the thickness of the glass article 100. The depth can be measured as the distance from the outer surface of the glass article 100 that is initially contacted with the mechanical cutting tool 300 (e.g., outer surface 108) to the distal end of the mechanical cutting tool 300. The initial depth is, for example, at least about 30% of the thickness of the glass article 100. Additionally, or alternatively, the initial depth is, for example, at most about 60% of the thickness of the glass article. The initial speed is, for example, at least about 10 mm/min, at least about 11 mm/min, at least about 12 mm/min, or at least about 12.5 mm/min. Additionally, or alternatively, the initial speed is, for example, at most about 15 mm/min, at most about 14 mm/min, or at most about 13 mm/min.

Figure 6:
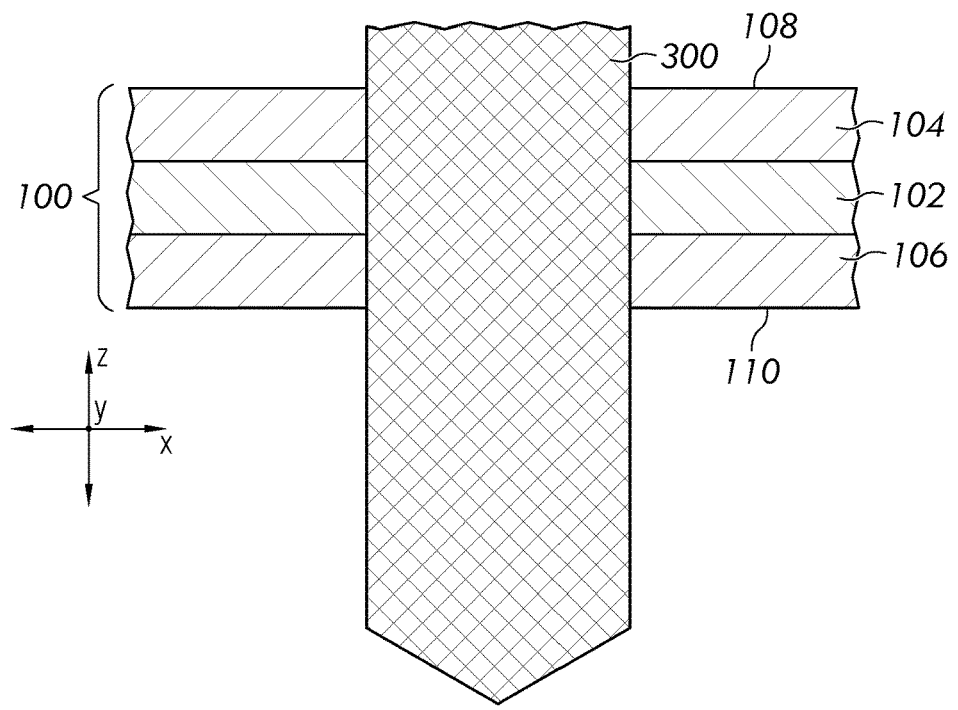
FIG. 6 is a cross-sectional schematic view of the mechanical cutting tool of FIGS. 3-4 after further advancing the mechanical cutting tool to a final depth.

In some embodiments, the drilling through the glass article 100 with the mechanical cutting tool 300 comprises further advancing the mechanical cutting tool 300 to a final depth at a final speed (e.g., after the contacting the outer surface of the glass article with the mechanical cutting tool 300 and advancing the mechanical cutting tool 300 through the glass article 100 at the initial speed). FIG. 6 is a cross-sectional schematic view of mechanical cutting tool 300 after further advancing the mechanical cutting tool 300 to the final depth. In the embodiment shown in FIG. 6, the final depth is greater than the thickness of glass article 100. Thus, a portion of the working portion of mechanical cutting tool 300 extends beyond outer surface 110 of glass article 100. In some embodiments, the final depth is less than or equal to the length of the working portion of mechanical cutting tool 300. Thus, the only portion of mechanical cutting tool 300 in contact with glass article 100 during the advancing steps is the working portion. The particle size of the abrasive particles of mechanical cutting tool 300 can vary along the length of the working portion as described herein. In some embodiments, as mechanical cutting tool 300 is further advanced, the abrasive particles in contact with glass article 100 become increasingly finer. Such a particle size gradient can help to reduce damage to the glass article and produce an aperture with a sufficient edge quality to enable the glass article to have the high flexural strength as described herein. The final speed is, for example, at least about 20 mm/min, at least about 25 mm/min, at least about 28 mm/min, at least about 30 mm/min, or at least about 31 mm/min. Additionally, or alternatively, the final speed is, for example, at most about 40 mm/min, at most about 35 mm/min, or at most about 32 mm/min.

Figure 7:
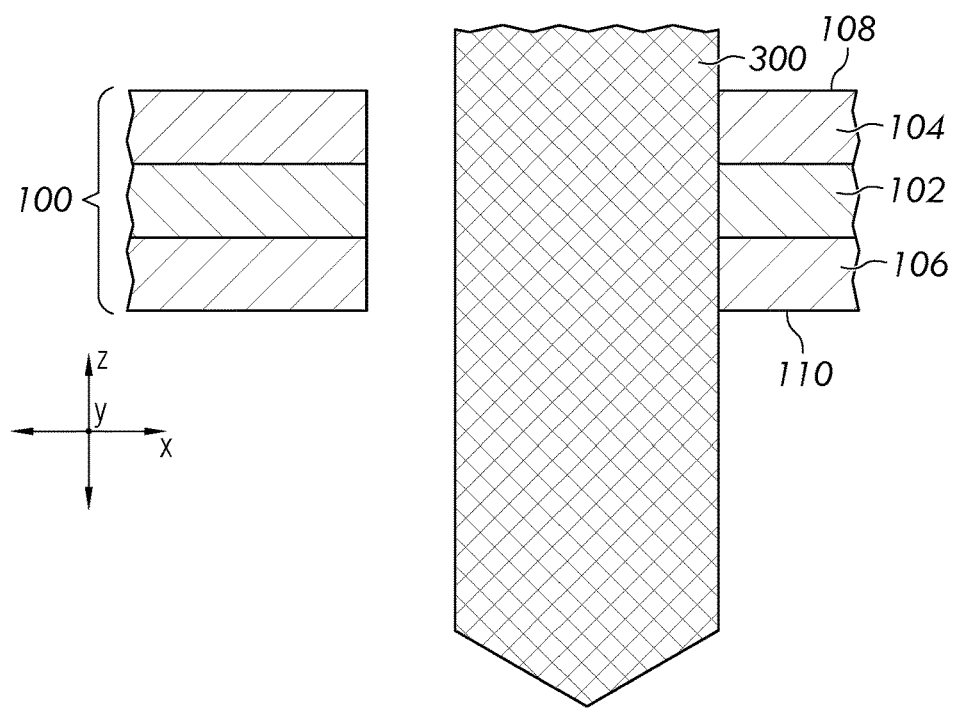
FIG. 7 is a cross-sectional schematic view of the mechanical cutting tool of FIGS. 3-5 after translating the mechanical cutting tool within the glass article.

In some embodiments, the method for forming the aperture in the laminated glass article comprises enlarging the pilot hole formed through the glass article 100. For example, the enlarging the pilot hole comprises translating the mechanical cutting tool 300 within the glass article 100. FIG. 7 is a cross-sectional schematic view of mechanical cutting tool 300 after translating the mechanical cutting tool 300 within the glass article 100. In some embodiments, translating mechanical cutting tool 300 within glass article 100 comprises moving the mechanical cutting tool in a transverse direction (e.g., an X-direction and/or a Y-direction) while the mechanical cutting tool 300 is engaged with the glass article 100 (e.g., after advancing the mechanical cutting tool and prior to withdrawing the mechanical cutting tool). Such translation of mechanical cutting tool 300 within glass article 100 removes glass material surrounding the pilot hole formed in the glass article to enlarge the pilot hole. The translation is controlled to remove sufficient material to form an aperture having a determined size and shape.

The mechanical cutting tool 300 can be withdrawn from the glass article 100 following the drilling step and/or the translating step.

In some embodiments, the mechanical cutting tool 300 is coupled to or a component of a computer numerical control (CNC) machine. The CNC machine can control the position of the mechanical cutting tool to advance, withdraw, and/or translate the mechanical cutting tool to form the aperture in the glass article as described herein. The CNC machine can enable precise control of the speed of such movement to help to reduce damage to the glass article and produce an aperture with a sufficient edge quality to enable the glass article to have the high flexural strength as described herein.

Laminated glass articles as described herein may present difficulties in forming apertures therethrough. Specifically, laminated glass articles generally comprise relatively high core tensile stresses due to the mismatch between CTEs of the core versus clad glass layers. For example, such laminated glass articles may have a maximum core tensile stress of about 57 MPa. This high core tensile stress may increase a likelihood of premature failure when creating apertures in the glass article. Hence, in some embodiments, a method for forming an aperture in a laminated glass article comprises first forming a pilot hole through the glass article with a piercing tool. Thereafter, a shaping tool is utilized to shape the pilot hole to the desired dimensions of the final aperture. For example, in some embodiments, forming the pilot hole may comprise first drilling through the glass article with a piercing tool followed by shaping the aperture with a shaping tool, such as the mechanical cutting tool 300 described above, or multiple successive shaping tools. Both the piercing tool and the shaping tool(s) may include, for example, a drill bit, a router bit, or another suitable cutting tool. By using a piercing tool, as described herein, failure of the laminated glass article during pilot hole/aperture formation may be reduced. The approach described below is contemplated to also be applicable to strengthened glass articles wherein the strengthening is the result of ion-exchange or thermal tempering of the glass articles.

Figure 12:
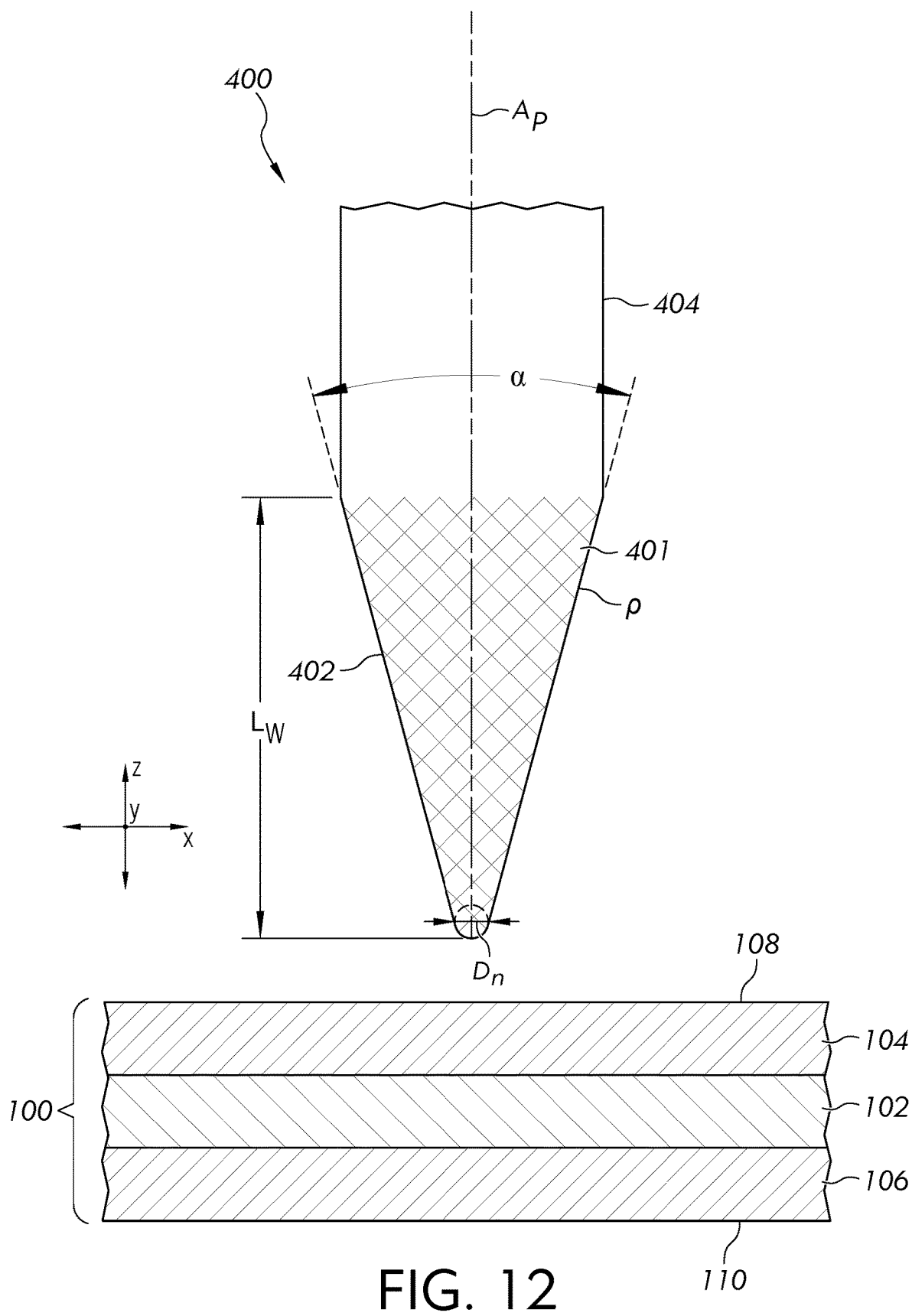
FIG. 12 is a cross-sectional schematic view of a piercing tool positioned to form a pilot hole in the glass article of FIG. 1.

FIG. 12 illustrates an exaggerated cross-sectional schematic view of glass article 100 prior to a pilot hole being formed therein and one exemplary embodiment of a piercing tool 400 positioned to form the pilot hole in the glass article 100. In some embodiments, piercing tool 400 comprises a piercing tool head 402 positioned at a distal end of the piercing tool and a piercing tool shaft 404 extending proximally from the piercing tool head 402. In the embodiment shown in FIG. 12, piercing tool head 402 is configured as a tapered head and comprises a tool axis $A_P$, a tip diameter $D_n$, and an included angle α. The piercing tool head 402 also includes particles of abrasive material with a grit size ρ. In embodiments, the tip diameter $D_n$ is, for example, less than about 0.6 mm, less than about 0.5 mm, or less than about 0.3 mm. In embodiments, the included angle α is, for example, less than about 65 degrees, at less than about 40 degrees, less than about 20 degrees, less than about 15 degrees, or less than about 10 degrees. By having an included angle α within the specified ranges, the risk of the glass article catastrophically failing (i.e., breaking) as the piercing tool is utilized to form the pilot hole through the article can be reduced.

In embodiments, piercing tool head 402 and piercing tool shaft 404 can be constructed as a unitary component or as separate components coupled together to form the piercing tool 400. Piercing tool 400 can be formed from or comprise, for example, diamond, silicon carbide, or another suitable material. In embodiments, piercing tool head 402 and piercing tool shaft 404 can be formed from the same or different materials. For example, piercing tool head 402 may be formed from a hard abrasive material (e.g., diamond or silicon carbide), and piercing tool shaft 404 is formed from a different material (e.g., steel). In some other embodiments, the piercing tool head 402 and/or the piercing tool shaft 404 is formed from a suitable tooling material (e.g., steel) and coated with particles of abrasive material 401. For example, piercing tool head 402 and/or piercing tool shaft 404 may be formed from stainless steel and coated with, for example and without limitation, diamond or silicon carbide.

In some embodiments, piercing tool 400 comprises particles of abrasive material 401 disposed on an outer surface of the piercing tool 400. For example, the piercing tool head 402 of piercing tool 400 comprises particles of abrasive material 401 disposed on an outer surface thereof. The piercing tool head 402 of piercing tool 400 comprises a working length $L_W$. In embodiments, the working length $L_W$ of the piercing tool head 402 of the piercing tool 400 is generally greater than a thickness of the glass article 100 on which it operates. That is, the piercing tool head 402 of the piercing tool 400 may comprise a working length $L_W$ that is at least long enough to pierce through the glass article 100. In embodiments, the working length $L_W$ of the piercing tool head 402 is at least 110% the thickness of the glass article 100 or at least about 115% the thickness of the glass article 100. For example, in embodiments, the piercing tool head 402 has a working length $L_W$ sufficient to penetrate through the glass article 100 to a predetermined depth of at least about 105% to about 115% (e.g., 110%+/−1%) of the thickness of the glass article 100. For example and without limitation, the working length $L_W$ may be at least about 0.5 mm, at least about 1 mm, at least about 1.5 mm, at least about 2 mm, at least about 2.5 mm, or at least about 3 mm. For example and without limitation, in embodiments, the working length $L_W$ may be at most about 10 mm, at most about 8 mm, at most about 6 mm, at most about 5 mm, or at most about 4 mm.

The particles of abrasive material 401 may comprise, for example and without limitation, diamond grit, brazed diamond grit, silicon carbide, or another abrasive material suitable for abrading glass, or combinations thereof. The particles of abrasive material 401 may have a variety of grit sizes. In some embodiments, the particles of abrasive material 401 comprise, consist essentially of, or consist of particles that are 700 grit or coarser, 600 grit or coarser, 500 grit or coarser, or 400 grit or coarser. Additionally, or alternatively, the abrasive particles comprise, consist essentially of, or consist of particles that are 200 grit or finer, 300 grit or finer, or 400 grit or finer. As described above with respect to the mechanical cutting tool 300, it is contemplated that the size particles of abrasive material 401 of the piercing tool 400 may gradually (e.g., continuously or substantially continuously) increase or decrease along the working length $L_W$ of the piercing tool head. For example, in some embodiments, the size of the particles of abrasive material 401 changes gradually from rough to fine along the working length $L_W$ from a distal end of the piercing tool head 402. Thus, the particles of abrasive material 401 in contact with the glass article 100 become finer as the piercing tool 400 is advanced farther into the glass article 100 as described herein. In some embodiments the size of the particles of abrasive material 401 changes gradually from fine to rough along the working length $L_W$ from a distal end of the piercing tool head 402. That is, the particles of abrasive material 400 in contact with the glass article 100 become rougher as the piercing tool 400 is advanced farther into the glass article 100. Thus, while the finer particles of abrasive material create the abrasion, the coarser particles of abrasive material may allow for faster boring of the pilot hole.

As described above, the piercing tool 400 may comprise a plurality of characteristics such as tip diameter $D_n$, included angle α, and particles of abrasive material with an average grit size ρ. These characteristics may be used to determine a single parameter, referred to as the ADG (angle, diameter, and grit) parameter, which is useful in determining whether a particular tool will be appropriate for use as a piercing tool for a glass article comprising high core tensile stresses as described herein. The ADG parameter is given by the following equation:

$$ADG = \frac{10\alpha D_\eta}{\rho} * 100\%$$

In the embodiments described herein, the piercing tool 400 may have an ADG of less than or equal to about 12%, less than or equal to about 10%, or less than or equal to about 5%. It has been found that piercing tools having an ADG parameter of less than or equal to about 12%, including less than or equal to about 10% or even less than or equal to about 5%, decrease the risk of the glass article catastrophically failing (i.e., breaking) as the piercing tool is utilized to form the pilot hole through the glass article.

In some embodiments, creating a pilot hole through the glass article 100 includes drilling through the glass article 100 with the piercing tool 400 by rotating the piercing tool 400 about the piercing tool axis at a rotational speed as the piercing tool 400 is advanced into the surface (e.g., the outer surface 108) of the glass article 100 and through the thickness of the glass article 100. The rotational speed may be, for example, at least about 40,000 revolutions per minute (rpm), at least about 45,000 rpm, at least about 50,000 rpm, at least about 55,000 rpm, or even at least about 56,000 rpm. Additionally, or alternatively, the rotational speed may be, for example, at most about 70,000 rpm, at most about 65,000 rpm, or at most about 62,000 rpm. For example, in embodiments, the rotational speed of the piercing tool is from about 56,000 rpm and to about 62,000 rpm. Rotational speeds from about 40,000 rpm to about 70,000 rpm can help to reduce damage to the glass article when creating a pilot hole in the glass article 100.

Figure 13A:
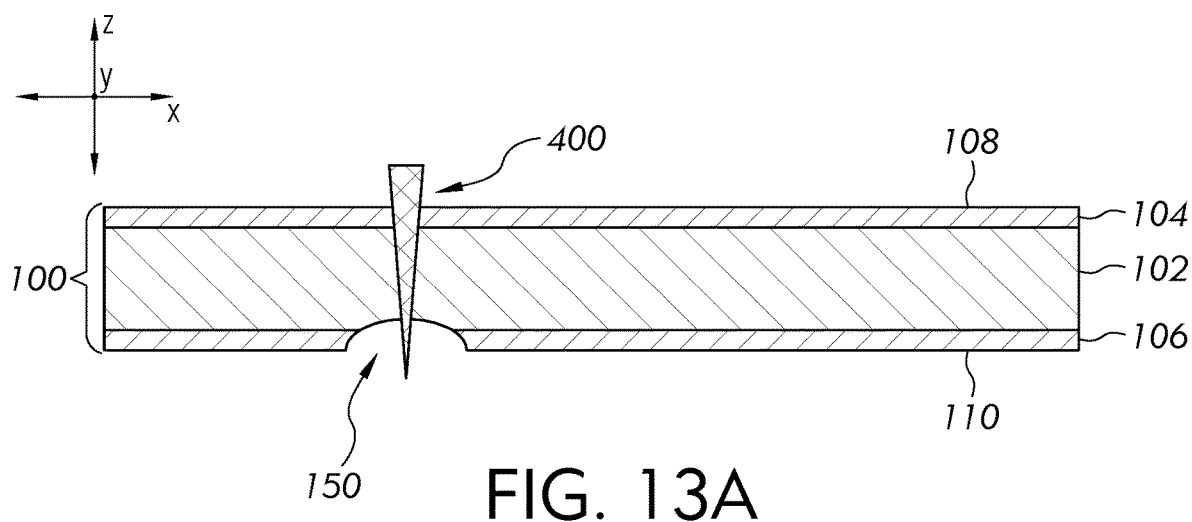
FIG. 13A is a cross-sectional schematic view of the piercing tool of FIG. 12 advancing through the glass article to form a pilot hole.

Drilling through the glass article 100 with the piercing tool 400 comprises contacting the outer surface 108 of the glass article 100 with the piercing tool 400 and advancing the piercing tool 400 through the glass article 100 at an advancing speed. In some embodiments, the piercing tool 400 is rotated at the rotational speed during the contacting and the advancing steps. Referring now to FIG. 13A, FIG. 13A is a cross-sectional schematic view of piercing tool 400 after contacting the outer surface 108 of glass article 100 and advancing the piercing tool 400 through the glass article 100. In some embodiments, advancing the piercing tool 400 through the glass article 100 comprises advancing the piercing tool 400 in a thickness direction (e.g. the Z-direction) through the glass article 100. For example, outer surface 108 of first cladding layer 104 is contacted with piercing tool 400, and the piercing tool 400 is advanced into the glass article 100 toward outer surface 110 of second cladding layer 106 at the advancing speed. In embodiments, the advancing speed may be from about 10 mm/min to about 15 mm/min (e.g., 13 mm/min). In some embodiments, piercing tool 400 is advanced at a constant speed until the piercing tool 400 penetrates entirely through glass article 100 as shown in FIG. 13A. As described above with respect to the mechanical cutting tool 300, it is contemplated that the piercing tool 400 may be advanced through the glass article at an initial speed that is followed by a final speed. For example, the final advancing speed may be faster than the initial advancing speed.

As the piercing tool 400 penetrates through the thickness of the glass article 100, a controlled relief section 150 may be produced in the glass article 100 on the outer surface 110 of the second glass layer. The controlled relief section 150 may extend partially into the core section 102 of the glass article 100. Without being bound by theory, the area of controlled relief section is thought to result from the fast advancing speed of the piercing tool 400. Using a piercing tool 400 as described herein to form the pilot hole in the glass article 100 may reduce subsurface damage to the glass article in the region of the controlled relief section 150, which may lead to a stronger glass article versus a glass article having greater subsurface damage during formation of a pilot hole.

Figure 13B:
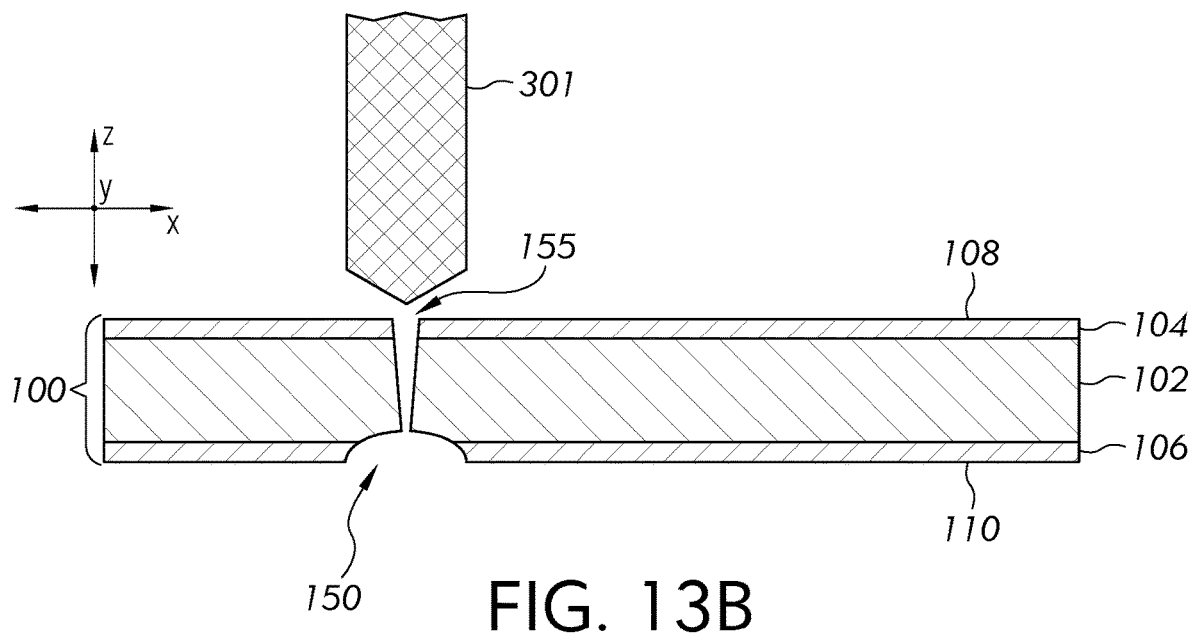
FIG. 13B is a cross-section schematic view of the shaping tool positioned over the pilot hole of FIG. 13A.

After formation of the pilot hole, the piercing tool 400 can be withdrawn from the glass article 100. FIG. 13B illustrates a cross-sectional schematic view the glass substrate of FIG. 13A after the piercing tool 400 has been withdrawn. As illustrated, the pilot hole 155 left by the piercing tool 400, may be substantially conical from the outer surface 108 to the controlled relief section 150. As such, the pilot hole 155 may have an entrance hole diameter at the outer surface 108 that narrows to a transition diameter at the controlled relief section 150. As depicted, the controlled relief section 150 widens to an exit hole diameter at the outer surface 110 of the second cladding layer 106. The size of the entrance hole diameter and the exit hole diameter are a function of the dimensions of the piercing tool 400 and are not herein limited to any particular size. As an example, and not a limitation, the entrance hole diameter may be about 150 µm to about 350 µm, the transition diameter may be about 100 µm to about 250 µm, and the exit hole diameter may be about 300 µm to about 600 µm.

Figure 14:
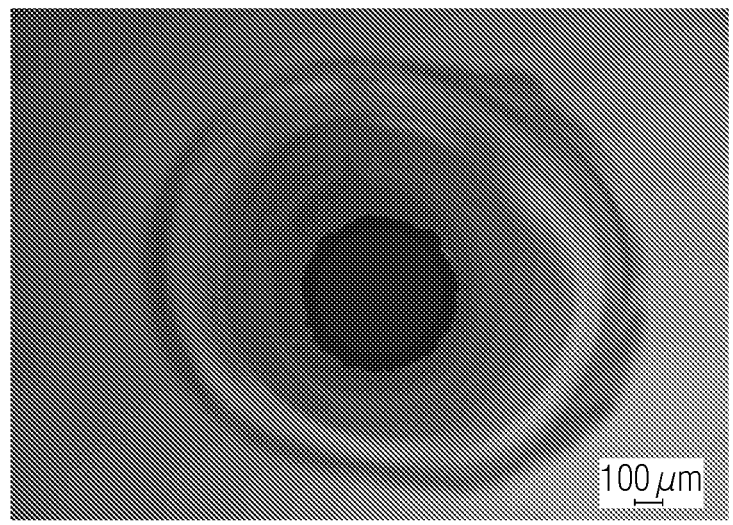
FIG. 14 is a photograph of a pilot hole created by a piercing tool taken from an entry surface of the glass article of FIG. 1.
Figure 15:
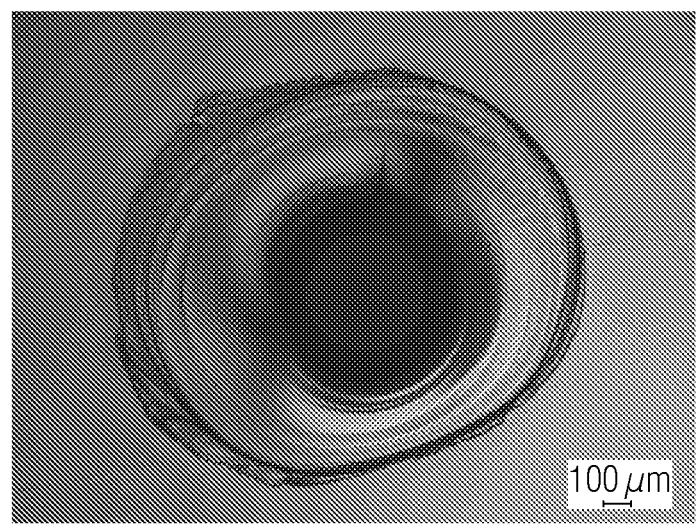
FIG. 15 is a photograph of the pilot hole of FIG. 14 taken from an exit surface of the glass article.

FIGS. 14 and 15 further illustrate the controlled relief section. Specifically, FIG. 14 is a photograph of the entrance hole diameter (darkest portion at center of the photograph) of a pilot hole in a glass article, and FIG. 15 is a photograph of the exit hole diameter (darkest portion at center of the photograph) of the controlled relief section for the same pilot hole. As shown in FIGS. 14-15, the entrance hole diameter of the pilot hole is smaller than the exit hole diameter. In this example the entry hole has a diameter of 275 µm, while the exit hole has a diameter of about 1400 µm to about 1700 µm.

In some embodiments, the piercing tool 400 is coupled to or a component of a computer numerical control (CNC) machine which facilitates both rotation of the piercing tool 400 at the rotational speed and advancing the piercing tool 400 at the advancing speed. The CNC machine can control the position of the mechanical cutting tool to advance, withdraw, and/or translate the mechanical cutting tool to form the aperture in the glass article as described herein. The CNC machine can enable precise control of the speed of such movement to help to reduce damage to the glass article and produce an aperture with a sufficient edge quality to enable the glass article to have the high flexural strength as described herein.

In some embodiments, the method for forming the aperture in the laminated glass article comprises enlarging the pilot hole formed through the glass article 100. For example, in embodiments, enlarging the pilot hole comprises translating a shaping tool through the pilot hole created by the piercing tool 400 to the shape pilot hole to the desired size. The shaping tool may be configured and advanced through the glass article as described above with respect to the mechanical cutting tool 300. In these embodiments (i.e., in embodiments where the pilot hole formed by the piercing tool 400 is subsequently enlarged with a second tool), the mechanical cutting tool will be referred to as the shaping tool 301 and any previous description of the mechanical cutting tool 300 applies to the shaping tool 301.

Figure 13C:
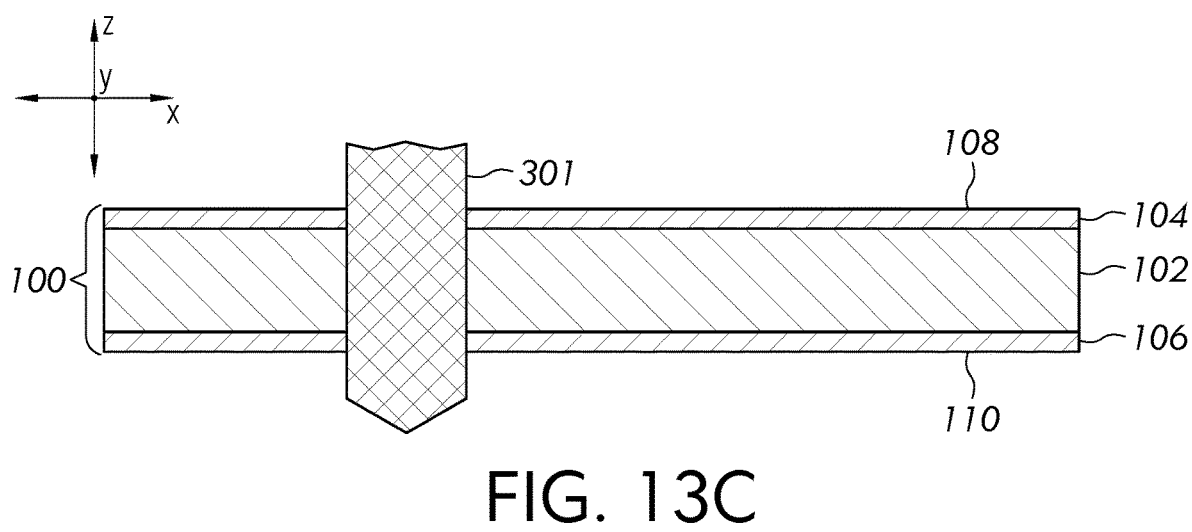
FIG. 13C is a cross-sectional schematic view of the shaping tool of FIG. 13B advancing through the glass article and pilot hole to form an aperture.

Referring now to FIG. 13B, FIG. 13B illustrates a cross-sectional schematic view of shaping tool 301 positioned over a pilot hole 155 created by the piercing tool 400 as illustrated in FIG. 13A. FIG. 13C illustrates a cross-section schematic view of the shaping tool 301 inserted in the pilot hole 155 thereby removing any subsurface damage and chipping caused by drilling the pilot hole with the piercing tool 400. The shaping tool 301 also shapes the pilot hole 155 to the desired dimensions of the finished aperture. It is noted that allowing extensive amounts of time between drilling the pilot hole and shaping the pilot hole with the shaping tool may allow for cracks caused by drilling to pilot hole to propagate further into the glass article, which may lead to the failure of the glass article. As such, it may be desirable to remove any damage (e.g., subsurface damage and chipping) caused by formation of the pilot hole in a timely manner to substantially prevent crack growth. As such, use of the shaping tool 301 to further process the pilot hoe 155 may immediately follow the formation of the pilot hole 155 by the piercing tool 400. For example, after the piercing tool 400 is withdrawn from the pilot hole 155, the shaping tool may be inserted to remove the subsurface damage and chipping after an elapsed time of less than about 1 minute. After the aperture has been shaped to the desired dimensions, the shaping tool 301 can be withdrawn from the glass article.

In some embodiments, the piercing tool 400 may be combined with the shaping tool 301. For example, and not as a limitation, in some embodiments the piercing tool head 402 illustrated in FIG. 12 may be integrated with the tool shaft 304 of the mechanical cutting tool 300 illustrated in FIG. 4 to form the shaping tool 301. Characteristics applicable to both the piercing tool 400 and the mechanical cutting tool 300, as described herein, would be applicable to the combined portions forming the shaping tool 301. In some embodiments, different portions of the combined tool may have particles of abrasive material with different grit size and/or materials. For example, and not as a limitation, the piercing tool portion of the combined tool may have a coarser grit than the shaping tool portion of the combined tool. In some embodiments, both the piercing tool portion and the combined tool portion may comprise the same grit size but may comprise particles of different abrasive materials.

In some embodiments, a series of successive shaping tools of different diameters and/or having different abrasive material may be used to form the pilot hole into an aperture having the desired dimensions. The successive shaping tools may have different grit sizes and/or different types of abrasive material. For example, a first shaping tool may include a first grit finish of abrasive material and a second shaping tool may include a second grit of finish abrasive material that is finer than the first grit finish. As a specific example, the first shaping tool may have a grit mesh of about 400 grit or finer and the second shaping tool may have a grit mesh of about 800 grit or finer.

As noted above, in yet further embodiments, the laminated glass article may be subjected to an ion exchange process after formation of the aperture. Such ion-exchange may increase the strength of the laminated glass article.

In some embodiments, coolant may be directed over at least one of the piercing tool 400 and the shaping tool 301 to cool the tool during pilot hole formation or shaping. The coolant may comprise a flow rate of about 1300 ml/min to about 1700 ml/min. In some embodiments, the coolant may flow throughout both pilot hole formation and subsequent shaping by the shaping tool 301. The use of coolant may slow crack propagation and may help prevent subsequent failure of the glass article 100.

EXAMPLES

Various embodiments will be further clarified by the following examples.

Example 1

A laminated glass sheet having the general structure shown in FIG. 1 was formed using a fusion draw process. The core layer was formed from an alkali aluminosilicate core glass composition with a CTE of about $58.7 \times 10^{-7}/°$ C. Each of the first cladding layer and the second cladding layer was formed from an alkali-free aluminosilicate clad glass composition with a CTE of about $32 \times 10^{-7}/°$ C. The thickness of the laminated glass sheet was 0.7 mm. A ratio of a thickness of the core layer to a total thickness of the first and second cladding layers was 6. The laminated glass sheet had a surface compression of about 190 MPa. The core layer had a tensile stress of about 31.7 MPa.

An aperture was formed in the laminated glass sheet using the following process. A pilot hole was formed by drilling through the thickness of the laminated glass sheet with a drilling tool, such as the mechanical cutting tool 300 described herein, mounted on a CNC machine. The drilling tool had been coated by an electroplating process with diamond abrasives. The drilling tool had a diameter of 1.3 mm and a working length of about 3.5 mm. The diamond abrasives ranged from rough 400 grit diamond sizes to fine 1200 grit diamond sizes. During the drilling, the drilling tool was rotating at a rotational speed of 59,970 rpm. The drilling tool was advanced to a depth of 0.5842 mm at an initial speed or feed rate of 12.7 mm/min. The drilling tool was further advanced to a final depth of 3.53 mm at a final speed or feed rate of 31.75 mm/min. At the final depth, the drilling tool was fully engaged. With the drilling tool fully engaged, the pilot hole was expanded by translating the drilling tool at a translational speed of 8.89 mm/min to form a circular hole with a 5 mm diameter. The process of forming the aperture was completed in less than 6 min.

Figure 8:
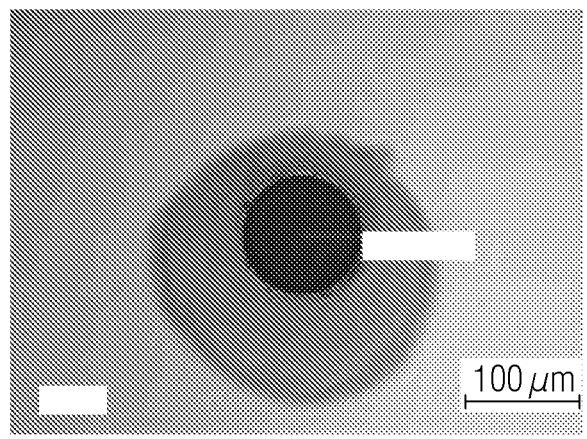
FIG. 8 is a photograph of a pilot hole taken from an entry surface of the glass article of FIG. 1.
Figure 9:
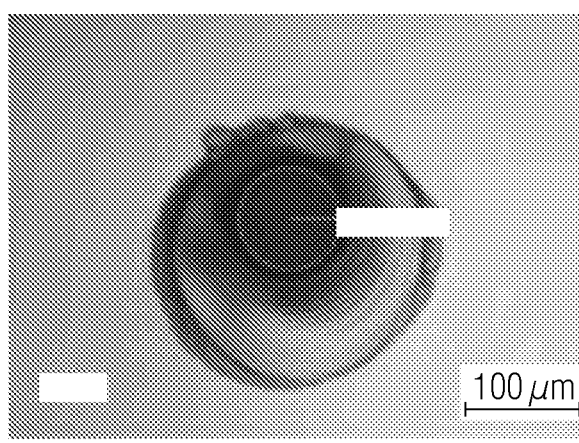
FIG. 9 is a photograph of the pilot hole of FIG. 8 taken from the exit surface of the glass article.

FIG. 8 is a photograph of the pilot hole taken from the entry surface of the glass article, and FIG. 9 is a photograph of the pilot hole taken from the exit surface of the glass article. As shown in FIGS. 8-9, the diameter of the pilot hole is smaller at the entry surface than at the exit surface. Thus, the pilot hole is tapered such that the pilot hole becomes increasingly larger through the thickness of the glass article. Without wishing to be bound by theory, it is believed that the increasing diameter of the pilot hole is the result of cone shaped cracking at the periphery of the pilot hole.

The process was repeated for 64 samples, and the yield was 93%. 30 samples were tested and had a mean peak load of 10.41 $kg_f$ and a mean flexural strength of 85.08 MPa, both determined using the modified ROR test.

Example 2

A laminated glass sheet having the general structure shown in FIG. 1 was formed using a fusion draw process. The core layer was formed from an alkali aluminosilicate core glass composition with a CTE of about $84.7 \times 10^{-7}/°$ C. Each of the first cladding layer and the second cladding layer was formed from an alkali aluminosilicate clad glass composition with a CTE of about $49.5 \times 10^{-7}/°$ C. The thickness of the laminated glass sheet was 0.55 mm. A ratio of a thickness of the core layer to a total thickness of the first and second cladding layers was 4. The laminated glass sheet had a surface compression of about 190 MPa. The core layer had a tensile stress of about 47.5 MPa.

An aperture was formed in the laminated glass sheet using the process described in Example 1.

The process was repeated for 66 samples, and the yield was 90%. 30 samples were tested and had a mean peak load of 5.708 $kg_f$ and a mean flexural strength of 80.05 MPa, both determined using the modified ROR test.

Example 3

A laminated glass sheet having the general structure shown in FIG. 1 was formed using a fusion draw process.

The core layer was formed from an alkali aluminosilicate core glass composition with a CTE of about $84.7\times10^{-7}/°$ C. Each of the first cladding layer and the second cladding layer was formed from an alkali aluminosilicate clad glass composition with a CTE of about $49.9\times10^{-7}/°$ C. The thickness of the laminated glass sheet was 0.55 mm. A ratio of a thickness of the core layer to a total thickness of the first and second cladding layers was 4. The laminated glass sheet had a surface compression of about 170 MPa. The core layer had a tensile stress of about 42.5 MPa.

An aperture was formed in the laminated glass sheet using the process described in Example 1.

The process was repeated for 64 samples, and the yield was 93%. 30 samples were tested and had a mean peak load of 6.82 $kg_f$ and a mean flexural strength of 94.82 MPa, both determined using the modified ROR test.

Comparative Example 1

A single-layer glass sheet formed from an ion-exchanged glass available as CONCORE from Corning Incorporated, Corning, N.Y. was formed. The glass sheet had a thickness of 0.7 mm.

No aperture was formed in the glass sheet.

24 samples were tested. The samples had a mean peak load of 248.7 $kg_f$ determined using the modified ROR test.

Comparative Example 2

A single-layer glass sheet formed from an ion-exchanged glass available as CONCORE from Corning Incorporated, Corning, N.Y. was formed. The glass sheet was the same as that described in Comparative Example 1.

An aperture was formed in the glass sheet by grinding a circular hole with a 5 mm diameter with a mechanical grinding tool.

The process was repeated for 7 samples. The samples had a mean peak load of 15.03 $kg_f$ determined using the modified ROR test.

Comparative Example 3

A laminated glass sheet having the general structure shown in FIG. 1 was formed using a fusion draw process. The laminated glass sheet was the same as that described in Example 1.

No aperture was formed in the laminated glass sheet.

30 samples were tested. The samples had a mean peak load of 212.2 $kg_f$ determined using the modified ROR test.

Comparative Example 4

A laminated glass sheet having the general structure shown in FIG. 1 was formed using a fusion draw process. The laminated glass sheet was the same as that described in Comparative Example 3.

An aperture was formed in the laminated glass sheet using a laser to form a circular hole with a 4 mm diameter and then enlarging the hole to a 5 mm diameter with a mechanical grinding tool.

30 samples were tested. The samples had a mean peak load of 11.7 $kg_f$ and a mean flexural strength of 98.12 MPa, both determined using the modified ROR test.

Comparative Example 5

A laminated glass sheet having the general structure shown in FIG. 1 was formed using a fusion draw process. The laminated glass sheet was the same as that described in Comparative Example 3.

An aperture was formed in the laminated glass sheet using a laser cutting process similar to that described in U.S. Patent Application Pub. No. 2015/0165560 to form a circular hole with a 5 mm diameter. No additional grinding or polishing was performed.

30 samples were tested. The samples had a mean peak load of 7.245 $kg_f$ and a mean flexural strength of 60.94 MPa, both determined using the modified ROR test.

Comparative Example 6

A laminated glass sheet having the general structure shown in FIG. 1 was formed using a fusion draw process. The core layer was formed from an alkali aluminosilicate core glass composition with a CTE of about $74.6\times10^{-7}/°$ C. Each of the first cladding layer and the second cladding layer was formed from an alkali-free aluminosilicate clad glass composition with a CTE of about $30.9\times10^{-7}/°$ C. The thickness of the laminated glass sheet was 0.55 mm. A ratio of a thickness of the core layer to a total thickness of the first and second cladding layers was 4.7. The laminated glass sheet had a surface compression of about 190 MPa. The core layer had a tensile stress of about 40.4 MPa.

No aperture was formed in the laminated glass sheet.

30 samples were tested. The samples had a mean peak load of 86.25 $kg_f$ determined using the modified ROR test.

Comparative Example 7

A laminated glass sheet having the general structure shown in FIG. 1 was formed using a fusion draw process. The laminated glass sheet was the same as that described in Comparative Example 6.

An aperture was formed in the laminated glass sheet using a laser cutting process similar to that described in U.S. Patent Application Pub. No. 2015/0165560 to form a slot with a 2.1 mm width and a 6.7 mm length. No additional grinding or polishing was performed.

13 samples were tested. The samples had a mean peak load of 4.867 $kg_f$ and a mean flexural strength of 83.48 MPa, both determined using the modified ROR test.

Comparative Example 8

A laminated glass sheet having the general structure shown in FIG. 1 was formed using a fusion draw process. The laminated glass sheet was the same as that described in Comparative Example 6.

An aperture was formed in the laminated glass sheet using a laser cutting process similar to that described in U.S. Patent Application Pub. No. 2015/0165560 to form a circular hole with a 5 mm diameter. No additional grinding or polishing was performed.

30 samples were tested. The samples had a mean peak load of 4.279 $kg_f$ and a mean flexural strength of 73.9 MPa, both determined using the modified ROR test.

Figure 10:
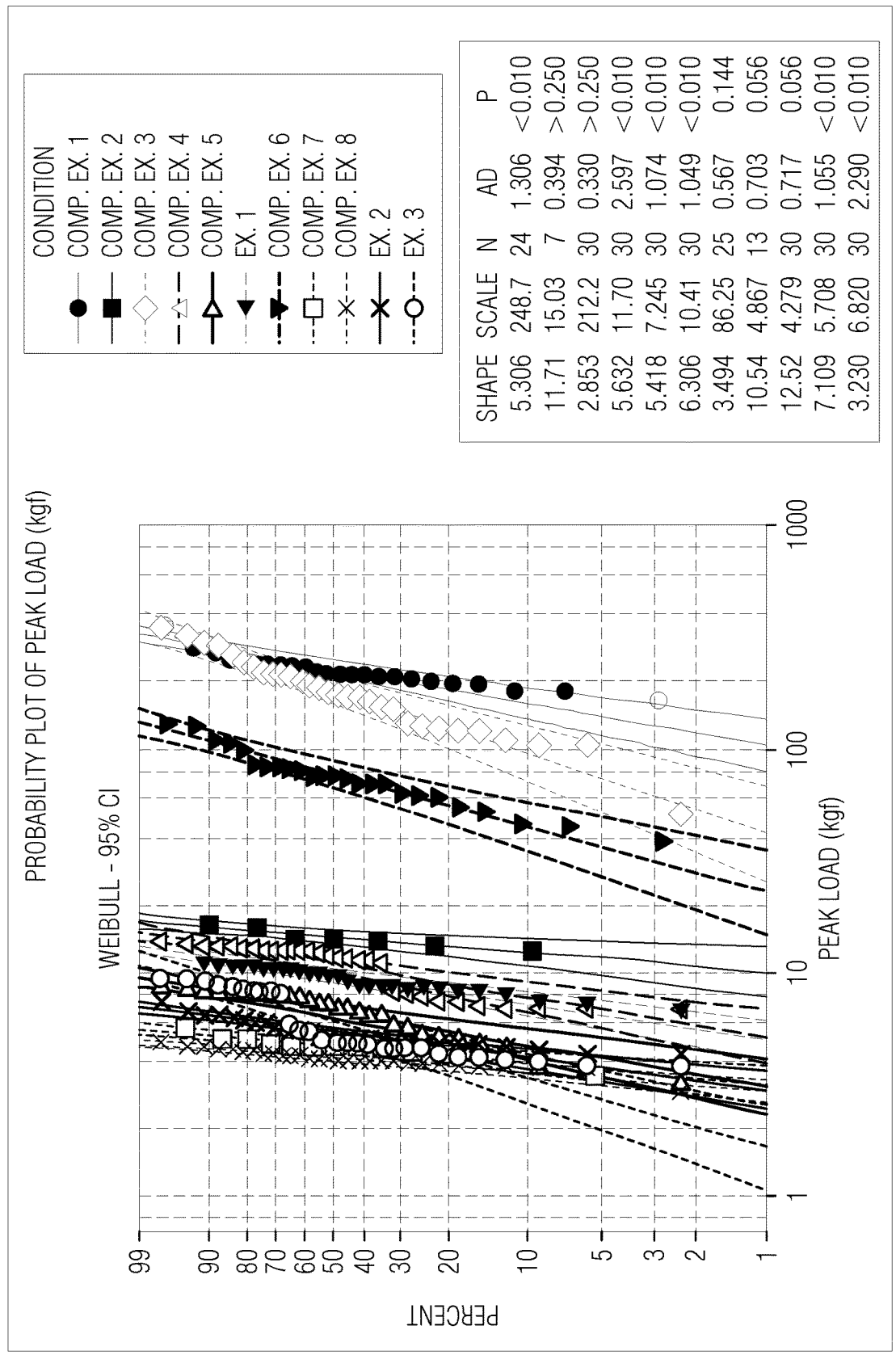
FIG. 10 is a Weibull plot illustrating the peak load at failure for glass articles of various examples and comparative examples determined using a modified ROR test.
Figure 11:
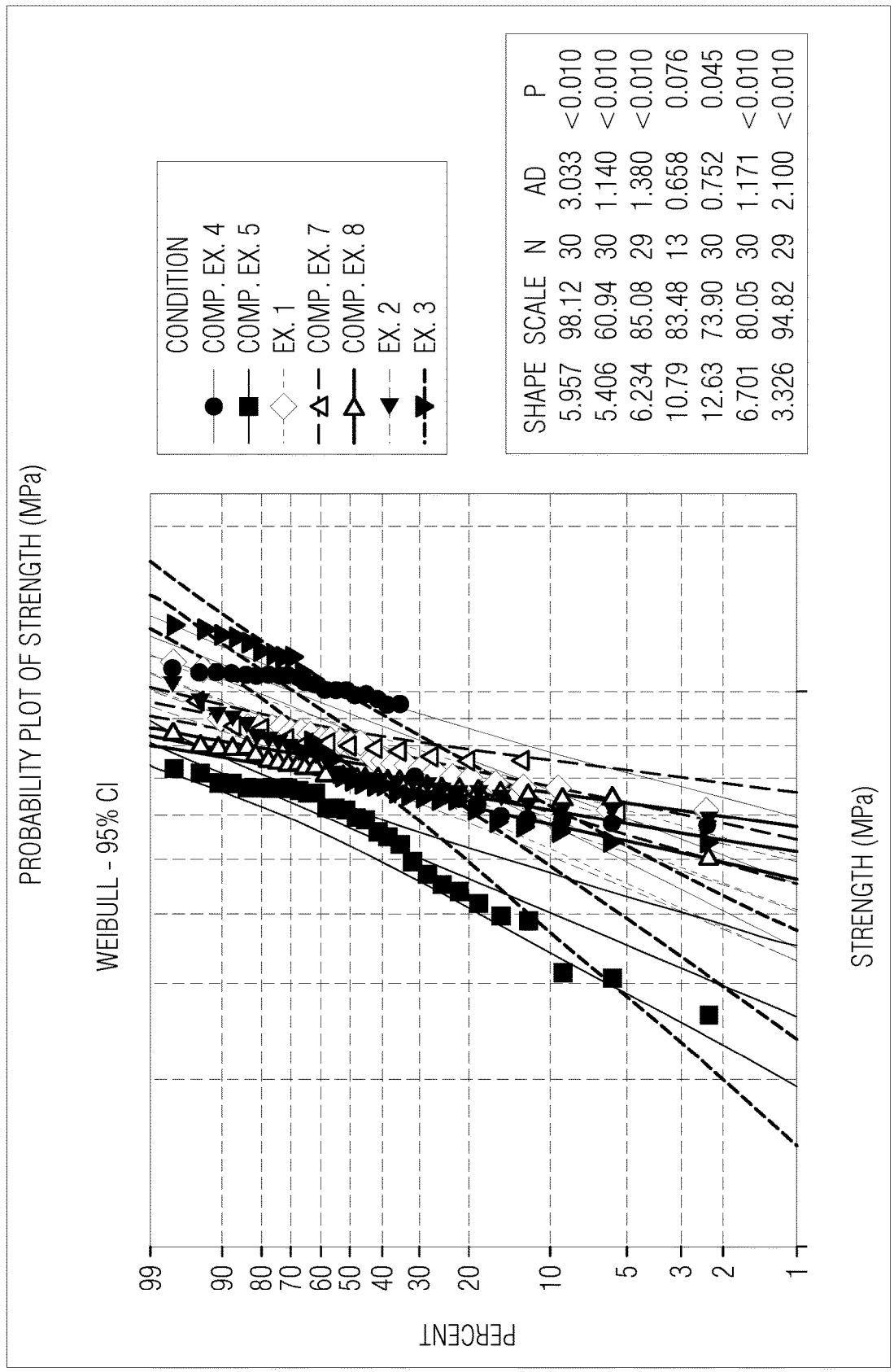
FIG. 11 is a Weibull plot illustrating the flexural strength of glass articles of various examples and comparative examples determined using the modified ROR test.

FIG. 10 is a Weibull plot illustrating the peak load at failure for glass articles of various examples and comparative examples determined using the modified ROR test. The peak load in $kg_f$ is plotted on the x-axis, and the percent is plotted on the y-axis. The data corresponding to the Weibull plot also is shown, and Table 1 below shows the data and the calculated mean, median, and $10^{th}$ percentile peak load values. FIG. 11 is a Weibull plot illustrating the flexural strength of glass articles of various examples and comparative examples determined using the modified ROR test. The flexural strength in MPa is plotted on the x-axis, and the percent is plotted on the y-axis. The data corresponding to the Weibull plot also is shown, and Table 2 below shows the data and the calculated mean, median, and 10$^{th}$ percentile peak load values.

TABLE 1

Peak Load Results

| | shape (k) | scale (λ) | Peak Load (kgf) | | |
|---|---|---|---|---|---|
| | | | mean | median | 10th percentile |
| Comp. Ex. 1 | 5.306 | 248.7 | 248.7 | 232.1009 | 162.7361032 |
| Comp. Ex. 2 | 11.71 | 15.03 | 15.03 | 14.56686 | 12.4021937 |
| Comp. Ex. 3 | 2.853 | 212.2 | 212.2 | 186.6179 | 96.42417439 |
| Comp. Ex. 4 | 5.632 | 11.7 | 11.7 | 10.96285 | 7.846132847 |
| Comp. Ex. 5 | 5.418 | 7.245 | 7.245 | 6.771105 | 4.782490278 |
| Ex. 1 | 6.306 | 10.41 | 10.41 | 9.822204 | 7.285642174 |
| Comp. Ex. 6 | 3.494 | 86.25 | 86.25 | 77.66093 | 45.29442017 |
| Comp. Ex. 7 | 10.54 | 4.867 | 4.867 | 4.700666 | 3.931300954 |
| Comp. Ex. 8 | 12.52 | 4.279 | 4.279 | 4.155551 | 3.575044195 |
| Ex. 2 | 7.109 | 5.708 | 5.708 | 5.421175 | 4.159175339 |
| Ex. 3 | 3.23 | 6.82 | 6.82 | 6.088416 | 3.397878685 |

TABLE 2

Strength Results

| | shape (k) | scale (λ) | Strength (MPa) | | |
|---|---|---|---|---|---|
| | | | mean | median | 10th percentile |
| Comp. Ex. 4 | 5.957 | 98.12 | 98.12 | 92.26499 | 67.25037918 |
| Comp. Ex. 5 | 5.406 | 60.94 | 60.94 | 56.94537 | 40.18994026 |
| Ex. 1 | 6.234 | 85.08 | 85.08 | 80.22213 | 59.29997611 |
| Comp. Ex. 7 | 10.79 | 83.48 | 83.48 | 80.69198 | 67.76504994 |
| Comp. Ex. 8 | 12.63 | 73.9 | 73.9 | 71.7863 | 61.83912639 |
| Ex. 2 | 6.701 | 80.05 | 80.05 | 75.78923 | 57.21555305 |
| Ex. 3 | 3.326 | 94.82 | 94.82 | 84.92632 | 48.20104866 |

Comparing Example 1 and Comparative Example 5 illustrates that the process described herein for forming an aperture in a glass article is capable of producing a glass article having a greater peak load and a greater flexural strength compared to laser cutting without additional grinding or polishing.

Comparing Example 1 and Comparative Example 3 illustrates that forming the aperture using the process described herein reduced the mean peak load sustainable by the glass article by 95.1%. In contrast, comparing Comparative Example 5 and Comparative Example 3 illustrates that forming the aperture using the laser cutting process reduced the mean peak load sustainable by the glass article by 96.6%.

PIERCING TOOL TESTING DATA

Various piercing tools as described herein were tested to determine an appropriate ADG parameter for use in creating a pilot hole through a laminated glass article having a high core tensile stress (e.g. a maximum core tensile stress of 57 MPa). In each case, a laminated glass sheet having the general structure shown in FIG. 1 was formed using a fusion draw process. The core layer was formed from an alkali aluminosilicate core glass composition. Each of the first cladding layer and the second cladding layer was formed from an alkali aluminosilicate clad glass composition. The thickness of the laminated glass sheet was about 0.55 mm. The thicknesses of each of the first cladding layer and the second cladding layer were about 69 μm. The maximum core tensile stress of the core layer was about 57 MPa. Tools A-J were used to create pilot holes in the laminated glass article. Each of the piercing tools was rotated at about 60,000 rpm with an advancing speed to speed of about 12.7 mm/min and had a cutting depth of about 0.58 mm. The specification of each tool is listed in Table 3. Each of tools A-J were tested 5 times for a total of 50 tests.

Referring to Table 3, below, it was found that piercing tools having an ADG parameter of about less than or equal to about 10% were successful at forming pilot holes without failure of the glass article in about 60% of the trials while piercing tools having an ADG parameter of 4% had a success rate of 100%. Therefore, it can be extrapolated that piercing tools having an ADG parameter of less than or equal to about 5% may have a success rate approaching 99%. The ADG parameter was determined to be inversely proportional to the success rate of forming a pilot hole in a laminated glass article having a maximum core tensile stress of 57 MPa.

TABLE 3

Piercing Tool Success Rates

| Tool | Angle (α) | Tip Diameter ($D_n$) | Grit (ρ) | Grit Mesh | ADG percentage | Successful Pilot Hole Formation Out of 5 Attempts |
|---|---|---|---|---|---|---|
| A | 12.075 | 0.288 | Fine | 400 | 9% | 60% |
| B | 12.705 | 0.454 | Coarse | 200 | 29% | 0% |
| C | 62.622 | 0.475 | Coarse | 200 | 149% | 0% |
| D | 45.867 | 0.459 | Coarse | 200 | 105% | 0% |
| E | 51.8 | 0.588 | Coarse | 200 | 152% | 0% |
| F | 47.193 | 0.373 | Fine | 400 | 44% | 0% |
| G | 50.3 | 0.361 | Coarse | 200 | 91% | 0% |
| H | 5.905 | 0.411 | Fine | 400 | 6% | 60% |
| I | 9.999 | 0.262 | Fine | 400 | 7% | 60% |
| J | 9.717 | 0.265 | Very Fine | 600 | 4% | 100% |

EXPERIMENTS WITH VARIOUS SHAPING TOOLS

Figure 16:
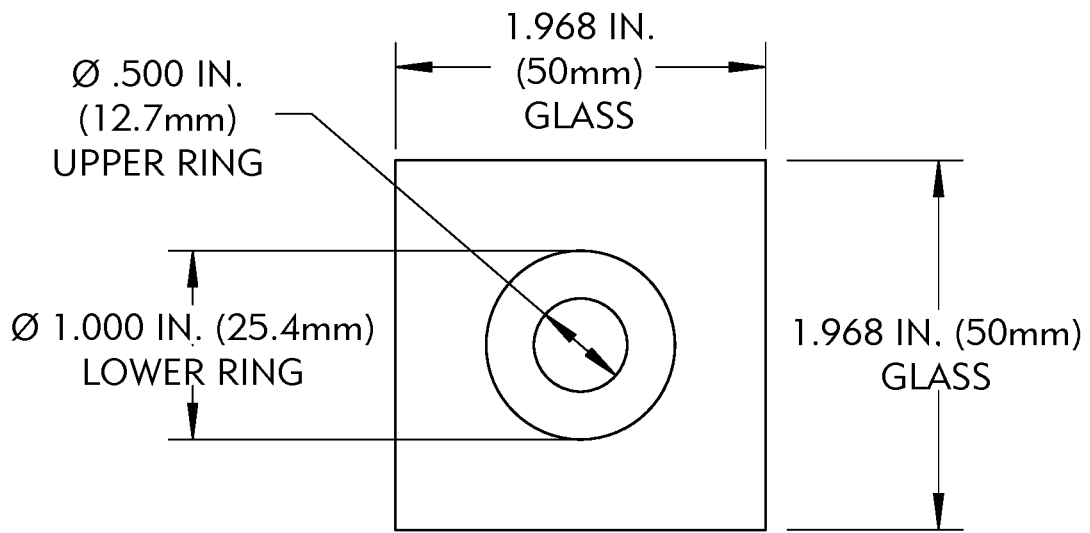
FIG. 16 illustrates a Ring-on-Ring testing set up on a laminated glass article not containing any apertures.

Referring to FIGS. 16-18 the modified ROR testing set up is schematically illustrated for various sized and shaped apertures created using both a piercing tool and a shaping tool as described above. In each case, a laminated glass sheet having the general structure shown in FIG. 1 was formed using a fusion draw process. The core layer was formed from an alkali aluminosilicate core glass composition. Each of the first cladding layer and the second cladding layer was formed from an alkali aluminosilicate clad glass composition. The thickness of the laminated glass sheet was about 0.55 mm. The thicknesses of each of the first cladding layer and the second cladding layer were about 69 μm. The maximum core tensile stress of the core layer was about 57 MPa. Each laminated glass sheet had a length of about 50 mm and a width of about 50 mm.

In the samples in which apertures were formed, the apertures were formed by first forming a pilot hole with a piercing tool, as described herein, having an ADG parameter of less than or equal to 10%. The piercing tool was used at a rotational speed of about 60,000 rpm and a feed rate of 12.7 mm/min. For each shaping tool used, the shaping tool had a rotational speed of about 60,000 rpm and a feed rate of 12.7 mm/min. For ring on ring testing, the upper ring had a diameter of about 12.7 mm and the lower ring had a diameter of about 25.4 mm. For samples having an aperture therein, the rings were positioned concentric with the aperture on opposite sides of the sample.

FIG. 16 illustrates the modified ROR control testing set up. As illustrated there is no aperture in the sample in the case of the control testing set up. FIG. 17 illustrates the modified ROR testing set up for a sample having an aperture of 1.6 mm. FIG. 18 illustrates the modified ROR testing set up for an aperture of 5 mm. The time for making the apertures was about 2 minutes and 30 second for the 1.6 mm holes and about 5 minutes for the 5 mm holes. Table 4 below illustrates the breakdown of the various samples that were subjected to the modified ROR test. As indicated in Table 4, each aperture was shaped, after pilot hole formation, using a shaping tool/tools (i.e., (1) a 400 grit shaping tool only, (2) a 400 grit shaping tool followed by a subsequent 800 grit shaping tool, and (3) a 400 grit shaping tool followed by a 1000 grit shaping tool). For each combination of shaping tools, half of the population of samples were subjected to ion-exchange after aperture formation. The ion-exchange process comprised submerging the laminated glass sheets (after aperture formation) into a 100% potassium salt bath at 420° C. for 6 hours.

TABLE 4

| Hole Finish | Samples Tested | | | | | |
|---|---|---|---|---|---|---|
| | 5 mm Hole | | 1.6 mm Hole | | No Hole or Slot | |
| | With IOX | Without IOX | With IOX | Without IOX | With IOX | Without IOX |
| 400 Grit | 10 | 10 | 10 | 10 | N/A | N/A |
| 400 Grit Rough/ 800 Grit Finish | 10 | 10 | 10 | 10 | N/A | N/A |
| 400 Grit Rough/ 1000 Grit Finish | 10 | 10 | 10 | 10 | N/A | N/A |
| Control (No Hole) | N/A | N/A | NA | N/A | 30 | 30 |

Figure 19:
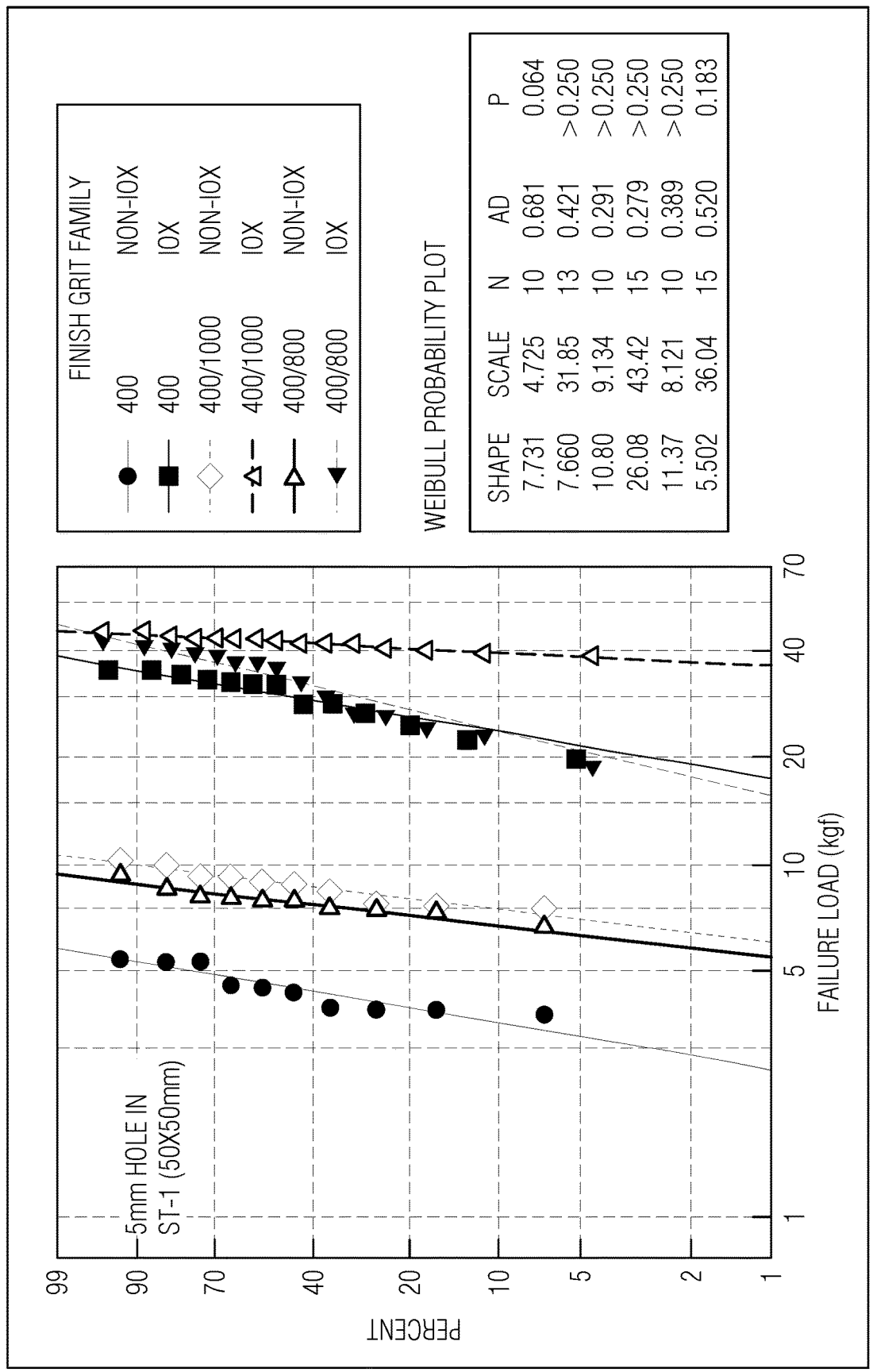
FIG. 19 is a Weibull plot illustrating the peak load at failure for glass articles of various examples determined using a modified ROR test of FIG. 19.

FIG. 19 is a Weibull plot illustrating the peak load at failure for glass articles having the 5 mm aperture formed therein as determined using the modified ROR test. The peak load applied to the samples, in $kg_f$, is plotted on the x-axis, and the failure probability (percent) is plotted on the y-axis. As illustrated, the characteristic strength of the glass article increased for both higher grit finishes (i.e., two shaping tools) and using ion exchange. Without ion exchange, peak load for a glass article having an aperture formed therein by a 400 grit shaping tool followed by a 1000 grit shaping tool was improved by about 50%. The addition of an ion exchange process improved the peak load strength by 9 times compared to only using a 400 grit finishing tool without ion-exchange. In either case (i.e. with ion-exchange, or without ion-exchange), using successively finer grit shaping tools reliably lead to an increase in glass strength.

Figure 20:
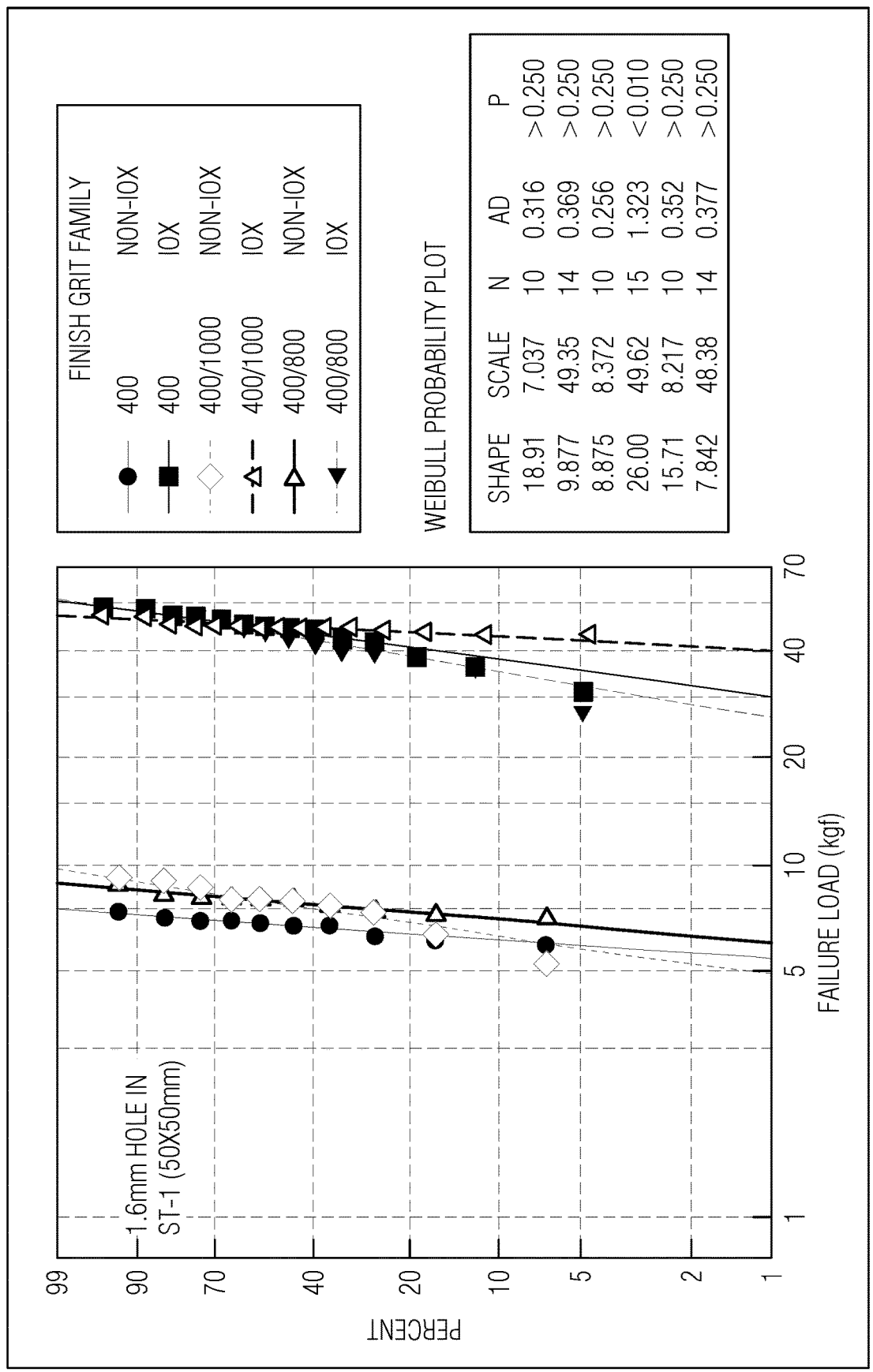
FIG. 20 is a Weibull plot illustrating the peak load at failure for glass articles of various examples determined using a modified ROR test of FIG. 18.

FIG. 20 is a Weibull plot illustrating the peak load at failure for glass articles having the 1.6 mm aperture formed therein determined using the modified ROR test. Between the ion exchange and non-ion exchange groups with smaller apertures (i.e., smaller than the 5 mm aperture), there was some improvement in the peak load strength between the 400 grit finish, the 400/800 grit finish, or the 400/1000 grit finish. The groups incorporating an ion exchange processes improved their peak load substantially compared to the non-ion-exchange groups.

Figure 21A:
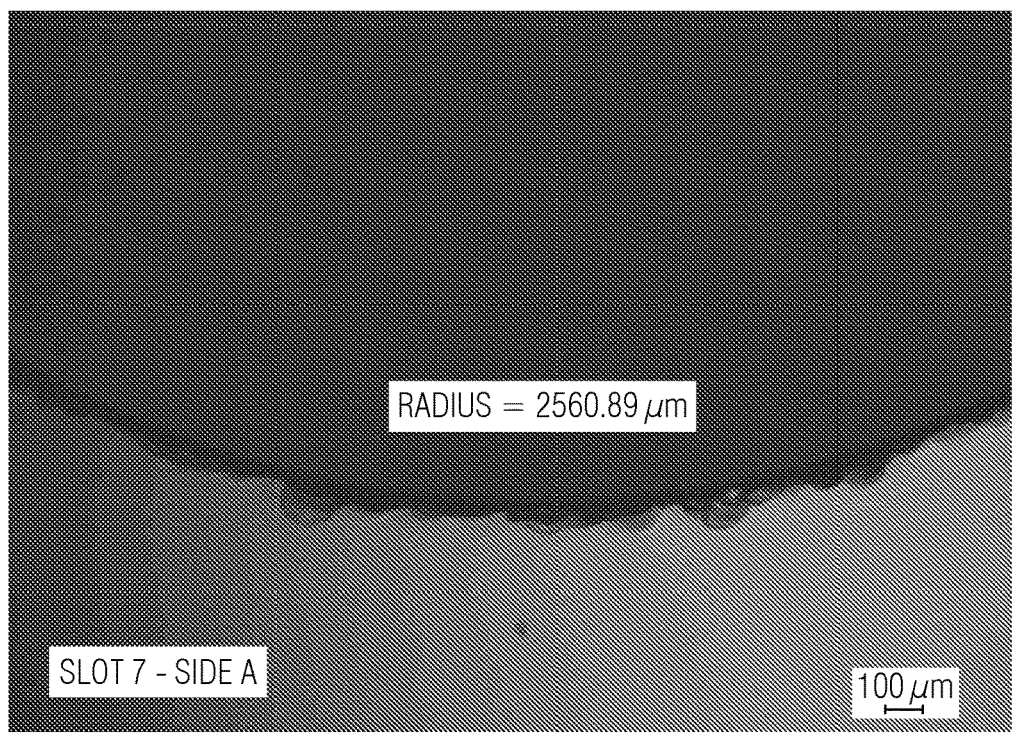
FIG. 21A is a photograph of Side A of a glass article with an aperture formed therein using a piercing tool followed by a shaping tool having a 400 grit finish.
Figure 21B:
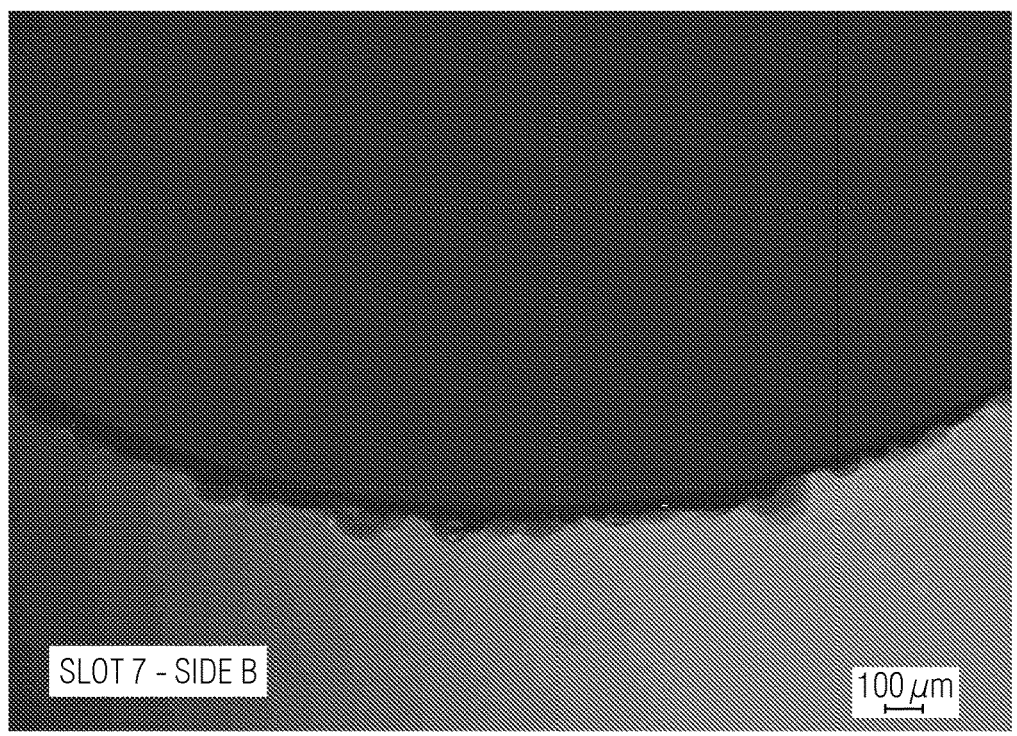
FIG. 21B is a photograph of Side B of the glass article of FIG. 21A.
Figure 21C:
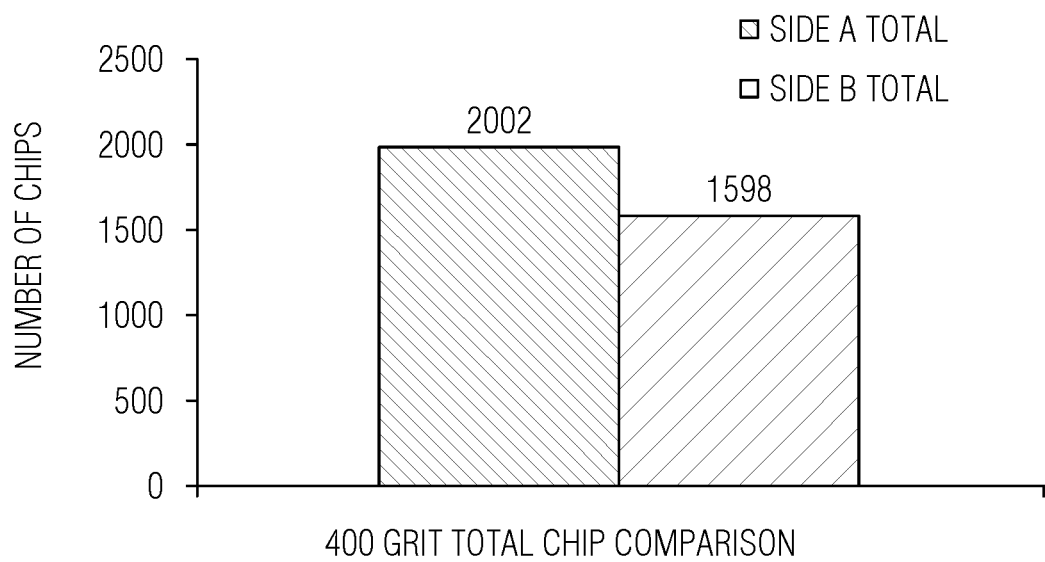
FIG. 21C is a graph illustrating the average number of chips for glass articles with an aperture formed therein using a piercing tool followed by a shaping tool having a 400 grit finish.

FIGS. 21A and 21B are photographs of opposite surfaces of a glass article with a 5 mm aperture formed therein subjected only to the 400 grit shaping tool after pilot hole formation. Referring to FIG. 21C, a graph depicts the average number of chips on either side of the glass article for a set of 10 samples with apertures formed under the same conditions. The average number of chips on side A of the glass article was 2002 while the average number of chips on the second side of the glass article was 1598.

Figure 22A:
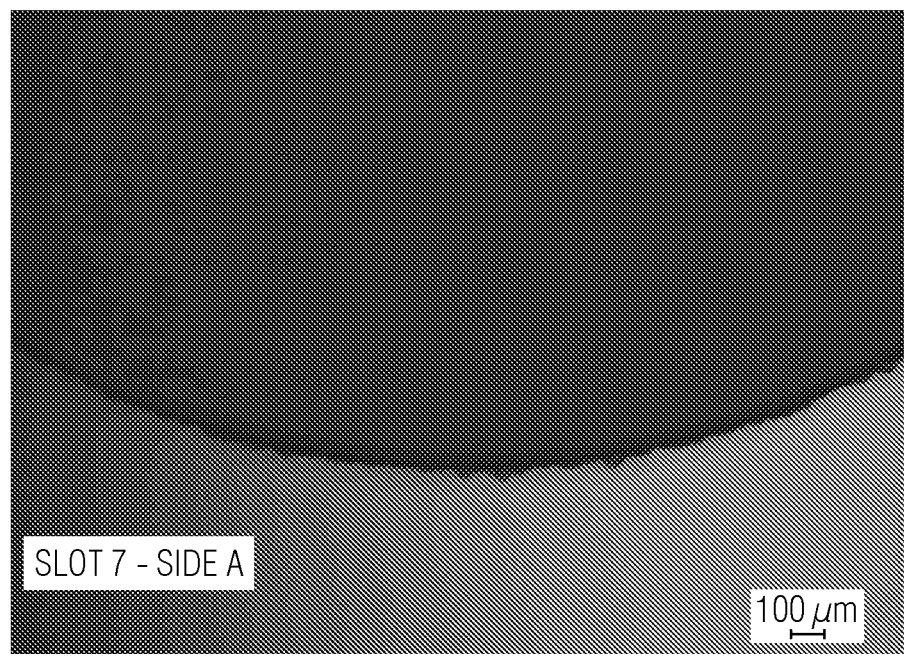
FIG. 22A is a photograph of Side A of a glass article with an aperture formed therein using a piercing tool followed by a shaping tool having a 400 grit finish followed by a shaping tool having an 800 grit finish.
Figure 22B:
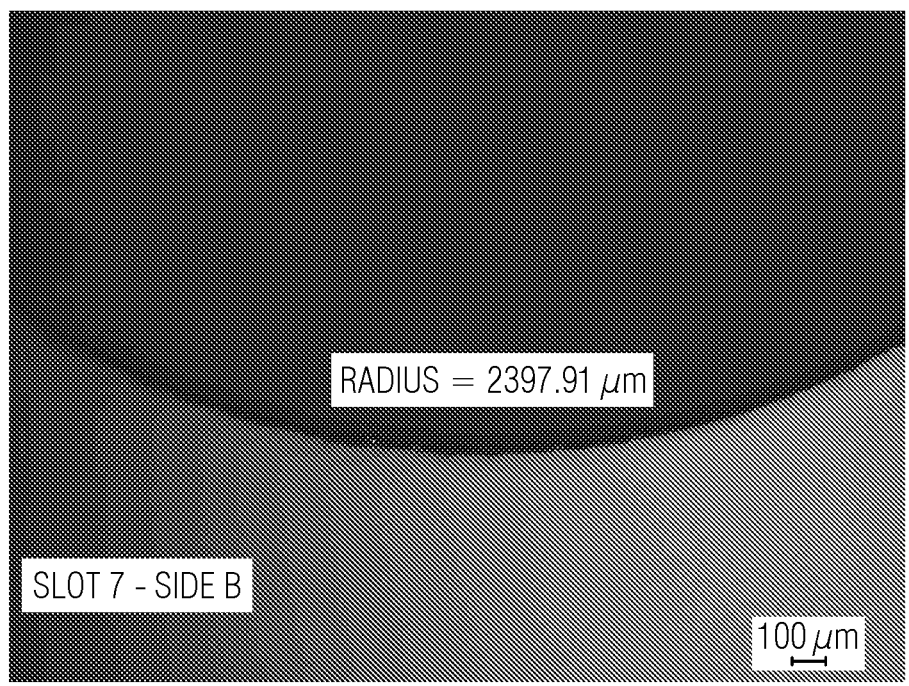
FIG. 22B is a photograph of Side B of the glass article of FIG. 21A.
Figure 22C:
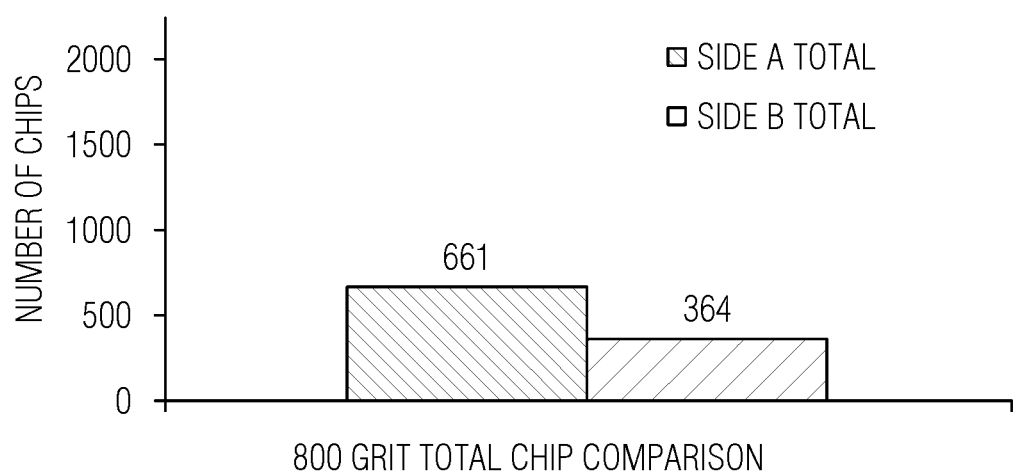
FIG. 22C is a graph illustrating the average number of chips for glass articles with an aperture formed therein using a piercing tool followed by a shaping tool having a 400 grit finish followed by a shaping tool having an 800 grit finish.

FIGS. 22A and 22B are photographs of opposite surfaces of a glass article with a 5 mm aperture formed therein subjected to the 400 grit shaping tool after pilot hole formation followed by the 800 grit shaping tool. Referring to FIG. 22C, a graph depicts the average number of chips on either side of the glass article for a set of 10 samples with apertures formed under the same conditions. The average number of chips on side A of the glass article was 661 while the average number of chips on the second side of the glass article was 364. The average number of chips was improved significantly as compared with only using the 400 grit shaping tool described above in regards to FIGS. 21A-21C.

Figure 23A:
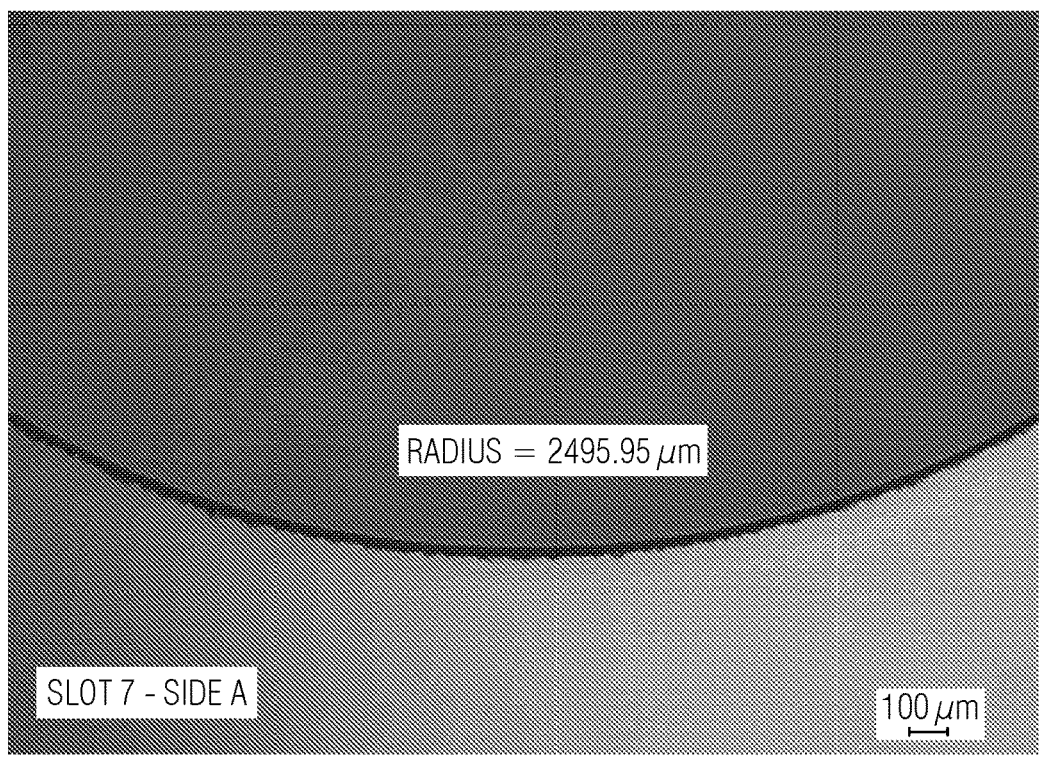
FIG. 23A is a photograph of Side A of a glass article with an aperture formed therein using a piercing tool followed by a shaping tool having a 400 grit finish followed by a shaping tool having an 1000 grit finish.
Figure 23B:
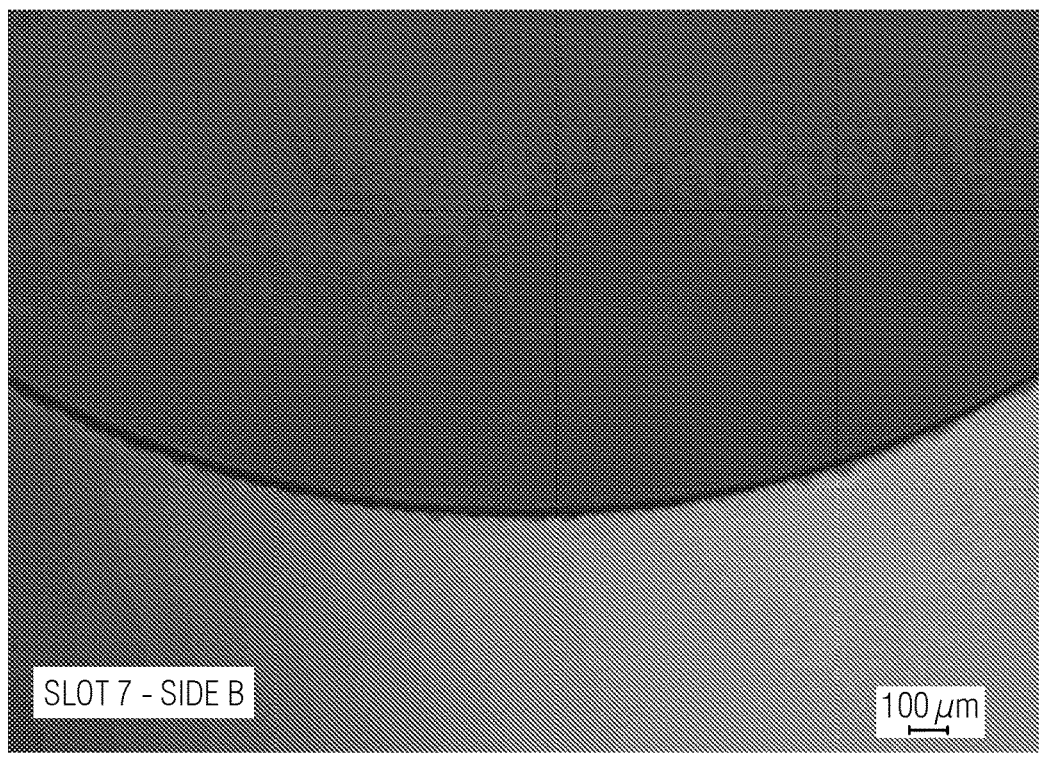
FIG. 23B is a photograph of Side B of the glass article of FIG. 23A.
Figure 23C:
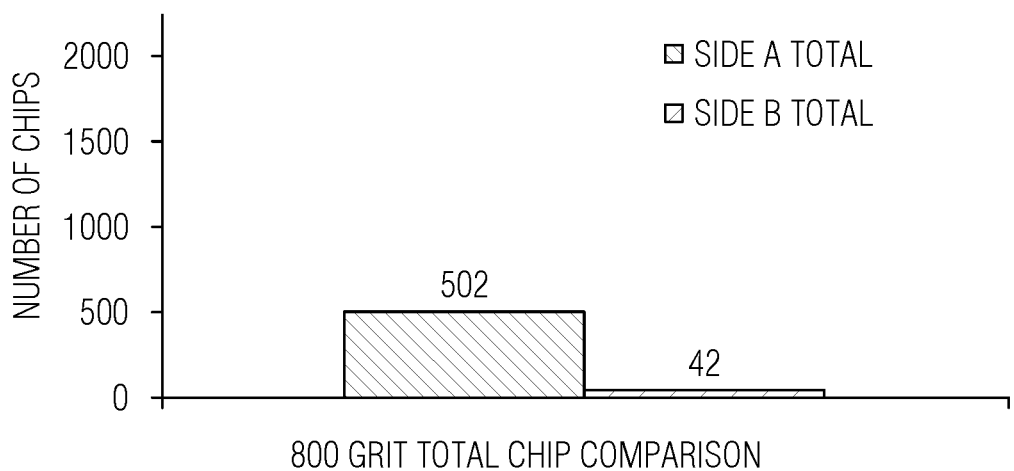
FIG. 23C is a graph illustrating the average number of chips for glass articles with an aperture formed therein using a piercing tool followed by a shaping tool having a 400 grit finish followed by a shaping tool having an 1000 grit finish.

FIGS. 23A and 23B are photographs of opposite surfaces of a glass article with a 5 mm aperture formed therein subjected to the 400 grit shaping tool after pilot hole formation followed by the 1000 grit shaping tool. Referring to FIG. 23C, a graph depicts the average number of chips on either side of the glass article for a set of 10 samples with apertures formed under the same conditions. The average number of chips on side A of the glass article was 502 while the average number of chips on the second side of the glass article was 42. Again the average number of chips was improved significantly as compared with only using the 400 grit shaping tool described above in regards to FIGS. 21A-21C or the 400 grit shaping tool followed by the 800 grit shaping tool as described above in regards to FIGS. 22A-22C.

Figure 24:
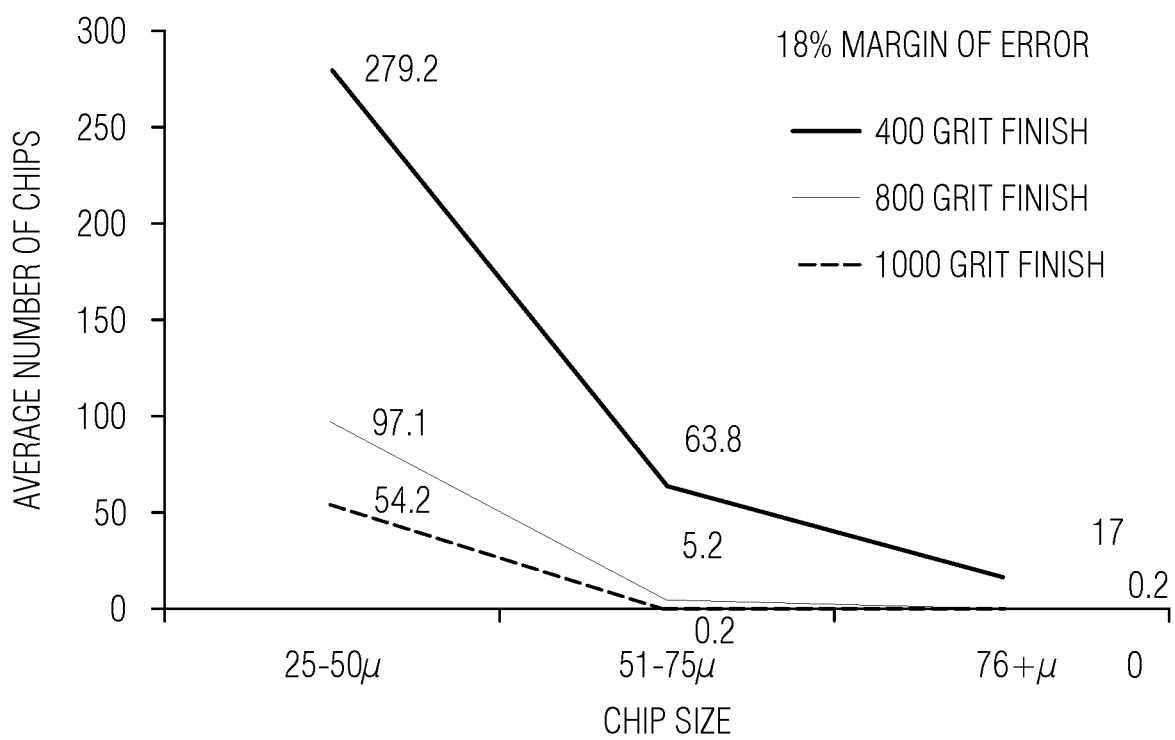
FIG. 24 is a graph illustrating the average number of chips experienced by a glass article with an aperture formed there in using a piercing tool followed by (1) a shaping tool having a 400 grit finish, (2) a shaping tool having a 400 grit finish followed by a shaping tool having an 1000 grit finish, and (3) a shaping tool having a 400 grit finish followed by a shaping tool having an 1000 grit finish versus chip size.

FIG. 24 is a graph depicting the average chip size of each grit finish (i.e. the 400 grit finish, the 400/800 grit finish, or the 400/1000 grit finish) versus the total average number of chips per sample. As illustrated, using only one shaping tool having a 400 grit finish had the highest number of chips and a greater number of larger chips. The average number of chips decreased when using a second pass with a finer shaping tool and the number of larger chip sizes was also substantially reduced.

As described herein, in one aspect of the present disclosure, a method for forming an aperture in a laminated glass article includes forming a pilot hole through the laminated glass article, the laminated glass article comprising a core layer disposed between a first glass cladding layer and a second glass cladding layer, the core layer comprising a core glass composition comprising a core coefficient of thermal expansion (CTE), each of the first cladding layer and the second cladding layer comprising a clad glass composition comprising a clad CTE, the clad CTE less than the core CTE such that each of the first cladding layer and the second cladding layer is under a compressive stress and the core layer is under a tensile stress, and enlarging the pilot hole formed through the glass article to form the aperture.

In a further aspect of the present disclosure, forming the pilot hole includes drilling through the laminated glass article with a mechanical cutting tool.

In a further aspect of the present disclosure, the drilling through the laminated glass article includes rotating the mechanical cutting tool about a tool axis at a rotational speed of at least about 40,000 rpm.

In a further aspect of the present disclosure, the drilling through the laminated glass article includes advancing the mechanical cutting tool through the laminated glass article at a speed of about 10 mm/min to about 15 mm/min.

In a further aspect of the present disclosure, enlarging the pilot hole includes translating the mechanical cutting tool within the laminated glass article.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method for forming an aperture in a laminated glass article, the method comprising:
    forming a pilot hole through the laminated glass article with a piercing tool having an ADG parameter of less than or equal to 12% as determined by the equation, $$ADG = \frac{10\alpha D_\eta}{\rho} * 100\%$$

where $D_\eta$ (mm) is a tip diameter of the piercing tool, $\alpha$ is an included angle of a tip of the piercing tool such that the tip is tapered, and $\rho$ is an average grit size (ANSI) of abrasive material on the piercing tool, the laminated glass article comprising a core layer disposed between a first glass cladding layer and a second glass cladding layer, the core layer comprising a core glass composition comprising a core coefficient of thermal expansion (CTE), each of the first glass cladding layer and the second glass cladding layer comprising a clad glass composition comprising a clad CTE, the clad CTE less than the core CTE such that each of the first glass cladding layer and the second glass cladding layer is under a compressive stress and the core layer is under a tensile stress; and
    enlarging the pilot hole formed through the laminated glass article with a shaping tool to form the aperture.

2. The method of claim 1, wherein the piercing tool comprises an included angle of less than about 15°.

3. The method of claim 1, wherein the piercing tool comprises a tip diameter of less than about 0.5 mm.

4. The method of claim 1, wherein the piercing tool comprises abrasive particles of 400 grit or finer disposed on an outer surface of the piercing tool.

5. The method of claim 1, wherein the piercing tool penetrates through a thickness of the laminated glass article by a predetermined depth from about 105% to about 115% of the thickness of the laminated glass article.

6. The method of claim 1, wherein enlarging the pilot hole with the shaping tool is performed within at least a minute of forming the pilot hole with the piercing tool.

7. The method of claim 1, wherein forming the pilot hole through the laminated glass article comprises rotating the piercing tool about a piercing tool axis at a rotational speed of at least about 50,000 rpm.

8. The method of claim 7, wherein forming the pilot hole through the laminated glass article comprises advancing the piercing tool through the laminated glass article at a speed from about 10 mm/min to about 15 mm/min.

9. The method of claim 1, wherein enlarging the pilot hole comprises translating the shaping tool within the laminated glass article.

10. The method of claim 1, further comprising flowing coolant from about 1300 ml/min to about 1700 ml/min to cool at least one of the piercing tool and the shaping tool.

11. The method of claim 1, wherein the shaping tool comprises abrasive particles disposed on an outer surface of the shaping tool.

12. The method of claim 11, wherein the shaping tool is a first shaping tool comprising a first grit finish and the method further comprises:
    inserting a second shaping tool comprising a second grit finish that is finer than the first grit finish into the aperture after enlarging the pilot hole with the first shaping tool.

13. The method of claim 12, wherein the first grit finish of the first shaping tool is about 400 grit or finer and the second grit finish of the second shaping tool is about 800 grit or finer.

14. The method of claim 1, further comprising subjecting the laminated glass article to an ion exchange process after formation of the aperture.

* * * * *